(12) United States Patent
Takev et al.

(10) Patent No.: US 10,421,102 B2
(45) Date of Patent: *Sep. 24, 2019

(54) SIDE TENSIONING SYSTEM FOR RETAINING SCREEN MEDIA IN A VIBRATING-TYPE SCREENING MACHINE

(71) Applicant: W. S. Tyler Canada Ltd., St. Catharines (CA)

(72) Inventors: Dieter Takev, St. Catharines (CA); Matthias Bremer, St. Catharines (CA)

(73) Assignee: W.S. Tyler Canada Ltd., St. Catherines (CA)

(*) Notice: Subject to any disclaimer, the term of this patent is extended or adjusted under 35 U.S.C. 154(b) by 51 days.

This patent is subject to a terminal disclaimer.

(21) Appl. No.: 15/813,365

(22) Filed: Nov. 15, 2017

(65) Prior Publication Data

US 2018/0071782 A1 Mar. 15, 2018

Related U.S. Application Data

(63) Continuation of application No. 15/094,335, filed on Apr. 8, 2016, now Pat. No. 9,931,672.

(51) Int. Cl.
*B07B 1/48* (2006.01)
*B07B 1/46* (2006.01)
(Continued)

(52) U.S. Cl.
CPC .................. *B07B 1/48* (2013.01); *B07B 1/46* (2013.01); *F16B 43/005* (2013.01);
(Continued)

(58) Field of Classification Search
CPC ........... B07B 1/42; B07B 1/46; B07B 1/4645; B07B 1/48; B07B 1/49; B07B 2201/02;
(Continued)

(56) References Cited

U.S. PATENT DOCUMENTS 3,186,547 A 6/1965 Behnke
4,148,724 A 4/1979 Hanson
(Continued)

FOREIGN PATENT DOCUMENTS

CN 201913070 U 8/2011
CN 202087522 U 12/2011
(Continued)

OTHER PUBLICATIONS

EU Extended Search Report, dated Sep. 13, 2017.

*Primary Examiner* — Joseph C Rodriguez
(74) *Attorney, Agent, or Firm* — Tysver Beck Evans

(57) ABSTRACT

A side tensioning assembly for retaining screen media to the side plates of a vibrating-type screening machine includes a support structure for supporting the screen media and a tensioning rail mountable to at least one side plate. At least one bolt assembly is provided for fastening the tensioning rail to at least one of the side plates. Each bolt assembly including a bolt connectable to the tensioning rail, at least one of side plates and at least one bolt engaging structure on a surface of the side plate. Each bolt engaging structure includes a cutout. The cutout is sized larger than the bolt but smaller than a nut. The movable plate has a bolt-securing position and a bolt-releasing position.

19 Claims, 35 Drawing Sheets

(51) Int. Cl.
*F16B 43/00* (2006.01)
*F16B 35/04* (2006.01)
*F16B 41/00* (2006.01)
*F16B 5/02* (2006.01)

(52) U.S. Cl.
CPC ......... *B07B 1/4645* (2013.01); *B07B 2201/02* (2013.01); *F16B 5/0216* (2013.01); *F16B 35/044* (2013.01); *F16B 35/048* (2013.01); *F16B 41/002* (2013.01)

(58) Field of Classification Search
CPC .... F16B 5/0216; F16B 5/0208; F16B 43/005; F16B 41/002
USPC ................ 209/319, 405, 408, 409, 412, 413
See application file for complete search history.

(56) References Cited

U.S. PATENT DOCUMENTS

| | | | |
|---|---|---|---|
| 4,319,992 A | 3/1982 | Davis et al. | |
| 5,104,521 A | 4/1992 | Rutherford | |
| 5,199,574 A | 4/1993 | Hollyfield et al. | |
| 6,006,923 A | 12/1999 | Helmy et al. | |
| 9,931,672 B2 * | 4/2018 | Takev | F16B 43/005 |
| 9,956,592 B2 * | 5/2018 | Newman | B07B 1/46 |

FOREIGN PATENT DOCUMENTS

| | | |
|---|---|---|
| CN | 202578590 U | 12/2012 |
| CN | 203304182 U | 11/2013 |
| CN | 203540910 U | 4/2014 |
| DE | 558308 | 9/1932 |
| DE | 1066181 | 12/1954 |
| DE | 1225950 | 9/1965 |
| EP | 0448179 | 9/1991 |
| EP | 0641608 | 8/1994 |
| EP | 0891819 | 1/1999 |
| FR | 2631255 | 5/1988 |
| GB | 580251 | 9/1946 |
| GB | 1526663 | 9/1978 |
| JP | 2-227176 | 9/1990 |
| JP | 8-57423 | 3/1996 |
| JP | 2011230011 | 11/2011 |
| WO | 2010097578 | 9/2010 |

* cited by examiner

SIDE TENSIONING SYSTEM FOR RETAINING SCREEN MEDIA IN A VIBRATING-TYPE SCREENING MACHINE

CROSS-REFERENCE TO RELATED APPLICATIONS

The present application claims priority to parent application U.S. application Ser. No. 15/094,335, filed on Apr. 8, 2016 and claims priority thereto.

FIELD OF THE INVENTION

The present invention relates generally to mechanical systems for holding in place screen media in a vibrating-type screening machine, and more specifically, to side tensioning assemblies for retaining such screen media to the side plates of a vibrating-type screening machine.

BACKGROUND OF THE INVENTION

Vibrating-type screening machines typically have vibrating mechanism operatively connected to deck frames which support screen media. In many such machines, the screen media is tightly held by side tensioning and supported below by a suitable structure typically imparting a curved shape to the screen media. This involves employing tensioning assemblies affixed to side plates which stand tall of the deck frame. A typical side tensioning assembly includes a tension rail fastened to the side plate using fastening hardware. The tension is configured to engage tensioning hooks connected to side edges of the screen media. When deployed, the tension rail applies a tensile force on the tensioning hooks which operates to draw the screen media down toward the deck frame and outward toward the side plate.

In some tensioning assemblies, the direction of the tensile force can be adjusted using an angle box mounted to the outer surface of the side plate. The angle box has a wedge-like structure which has an oblong opening formed therein that is configured to communicate with an aperture defined in the side plate. The oblong opening in the wedge-like structure and the aperture defined in the side plate are aligned to receive therethrough a bolt having a particular angled orientation which corresponds to the desired direction in which the tensile force is to be applied. The bolt is part of the fastening hardware that is used to tie the tension rail to the side plate.

In a typical installation of such a tensioning assembly, the bolt is first fitted through an aperture formed in the tension rail. The remaining portion of the bolt is inserted through the aperture defined in the side plate and extends through the oblong opening in the angle box. The terminal end of the bolt protrudes from the angle box away from the side plate, where a washer and nut engage the bolt. In order to create the requisite tension to retain the screen media, the nut is tightened against the washer which sits between the angle box and the nut.

Such tensioning assemblies tend to be effective in tightly retaining the screen media between the side plates. However, concerns have been expressed regarding the number of loose parts in such tensioning assemblies. More specifically, in the tensioning assembly of the type described above, the fastening hardware includes a bolt, a nut and a washer, and then there is also the tension rail. Some vibrating-type screen machines can be quite large and have multiple deck frames stacked one over the other. Such machines tend to require many sections of tension rail and many tensioning assemblies, thereby further exacerbating the problem of having too many loose parts. Such parts take time to assemble and can easily be dropped, mishandled or lost, thereby leading to increased downtime of the machine while the screen media is being replaced. As a result, a steady supply of replacement fastening hardware must be kept on hand. This can be a serious disadvantage in applications which require frequent replacement of the screen media due to wear and tear or other reasons. All the more so, because such screen media maintenance or service activities typically require two workmen to carry them out.

In light of the foregoing, it would be advantageous to have a tensioning assembly which can easily be deployed rapidly and with ease, and which obviates the above-described drawbacks associated with known tensioning assemblies that employ angle boxes.

SUMMARY OF THE INVENTION

In accordance with one embodiment of the present invention, there is provided a side tensioning assembly for retaining screen media to a side plate in a vibrating-type screening machine. The side plate has an inner surface and an outer surface. The side tensioning assembly includes a tensioning rail mountable to the inner surface of the side plate and connectable to a portion of the screen media; at least one angle box mountable to the outer surface of the side plate; and at least one bolt assembly for fastening the tensioning rail to the side plate and to the at least one angle box. The at least one bolt assembly includes a bolt connectable to the tensioning rail, the side plate and the at least one of angle box, a nut threadably engaged with the bolt for retaining the bolt to the at least one the angle box, and a shoulder bolt secured to a terminal end of the bolt. The shoulder bolt is sized to prevent the nut from becoming physically separated from the bolt. The at least one angle box includes an aperture defined therein which is sized to allow the bolt assembly unobstructed passage therethrough. The at least one angle box also has a movable plate with a cutout formed therein. The cutout is sized larger than the bolt but smaller than the nut. The movable plate is movable between a bolt-securing position and a bolt-releasing position. In the bolt-securing position, the movable plate partially occludes the aperture in the angle box with the cutout aligned with the aperture in the angle box such that when the bolt is tightly fastened to the angle box with the nut, the tensioning rail is drawn tightly against the inner surface of the side rail thereby applying a tensile force to the portion of the screen media. In the bolt-releasing position, the movable plate is positioned so as to provide unobstructed access to the aperture in the angle box such that the bolt assembly can be detached from the angle box without requiring disassembly of the bolt assembly.

In another feature, the bolt is a carriage bolt. In a further feature, the nut is a flange nut. In yet another feature, the nut is a first nut, and the side tensioning assembly further includes a second nut for securing the bolt to the tensioning rail. The second nut is a half nut.

In an additional feature, the aperture in the angle box is circular. Alternatively, the aperture in the angle box has a shape selected from the group consisting of: (a) circle; (b) a square; (c) a rectangle; (d) an oval; and (e) an oblong.

In another feature, the movement of the movable plate relative to the angle box is selected from the group consisting of: (a) translation; (b) rotation; and (c) a combination of sliding and rotation.

In alternative feature, the movable plate is slidable relative to the angle box in a motion selected from the group consisting of: (a) side-to-side motion; (b) up and down motion and (c) motion along a diagonal direction. In another alternative feature, the movable plate is hingedly connected to the angle box. In a further feature, the movable plate is pivotally connected to the angle box. Optionally, the movable plate may be tethered to the angle box.

In a further feature, the angle box includes first and second pins attached thereto. The movable plate has defined therein first and second, spaced apart slots. Each slot is configured to receive therethrough a respective one of the first and second pins.

The slots serve as a track to guide sliding movement of the movable plate relative to the angle box. In one feature, the slots have an orientation selected from the group consisting of: (a) a vertical orientation; (b) a horizontal orientation; and (c) a diagonal orientation.

In still another feature, the movable plate is generally planar and the sliding movement of the movable plate is confined along the plane of the movable plate.

In yet another feature, the angle box includes a base portion and a wedge-shaped structure carried on the base portion. The wedge-shaped structure has an wall oriented on an angle through which the aperture in the angle box is formed. The movement of the movable plate between the bolt-releasing position and the bolt-securing position occurs generally parallel to the angled wall of the wedge-shaped structure.

In one feature, the angle box includes a base portion and a wedge-shaped structure carried on the base portion. The first second pins are attached to one of the base portion and the wedge-shaped structure.

In another alternative feature, the movable plate includes a first main planar portion and a second portion angled away from the first main portion. The first and second slots extend through both the first and second portions of the movable plate. The angle box includes a base portion and a wedge-shaped structure carried on the base portion. The wedge-shaped structure has an wall oriented on an angle through which the aperture in the angle box is formed. When the movable plate is moved to its bolt-securing position, the first main planar portion lies generally parallel to the angled wall of the wedge-shaped structure. When the movable plate is moved to its bolt-releasing position, the first main planar portion has a skewed orientation relative to the angled wall of the wedge-shaped structure.

In a further feature, the angle box includes a pin attached thereto. The movable plate has defined therein a slot configured to receive therethrough the pin. The slot serves as a track to guide the sliding and the swiveling movement of the movable plate relative to the angle box.

In another broad aspect of the present invention, there is provided a side tensioning system for retaining screen media between opposed first and second side plates in a vibrating-type screening machine. Each side plate has an inner surface and an outer surface. The side tensioning system includes a first tensioning assembly operatively connectable to the first side plate. The first tensioning assembly includes a first tensioning rail mountable to the inner surface of the first side plate and connectable to a first portion of the screen media, at least one angle box mountable to the outer surface of the first side plate, and at least one bolt assembly for fastening the first tensioning rail to the first side plate and to the at least one angle box of the first tensioning assembly. The system also includes a second tensioning assembly operatively connectable to the second side plate. The second tensioning assembly includes a second tensioning rail mountable to the inner surface of the second side plate and connectable to a second portion of the screen media, at least one angle box mountable to the outer surface of the second side plate, at least one bolt assembly for fastening the second tensioning rail to the second side plate and to the at least one angle box of the second tensioning assembly. Each bolt assembly includes a bolt connectable to one of the first and second tensioning rails, one of the first and second side plates and one of the angle boxes, a nut threadably engaged with the bolt for retaining the bolt to one of the angle boxes, and a shoulder bolt secured to a terminal end of the bolt. The shoulder bolt serves to prevent the nut from becoming physically separated from the bolt. Each angle box includes an aperture defined therein sized to allow the bolt assembly unobstructed passage therethrough, and a movable plate with a cutout formed therein. The cutout is sized larger than the bolt but smaller than the nut. The movable plate is movable between a bolt-securing position and a bolt-releasing position. In the bolt-securing position, the movable plate partially occluding the aperture in the angle box with the cutout aligned with the aperture in the angle box such that when one bolt of the bolt assembly is tightly fastened to the angle box with one nut of the bolt assembly, one of the first and second tensioning rails is drawn tightly against the inner surface of the first and second side rail thereby applying a tensile force to one of the first or second portions of the screen media. In the bolt-releasing position, the movable plate being positioned so as to provide unobstructed access to the aperture in the angle box such that the bolt assembly can be detached from the angle box without requiring disassembly of the bolt assembly.

In yet another broad aspect of the invention, there is provided a vibrating-type machine which has a frame that includes a deck frame for supporting screen media, and a pair of spaced apart first and second side plates attached to the frame. Each side plate has an inner surface and an outer surface. The machine is further provided with a mechanism for imparting vibratory movement to the frame, screen media positionable between the first and second side plates and a tensioning system for retaining screen media between the first and second side plates. The side tensioning system includes a first tensioning assembly operatively connectable to the first side plate. The first tensioning assembly includes a first tensioning rail mountable to the inner surface of the first side plate and connectable to a first portion of the screen media, at least one angle box mountable to the outer surface of the first side plate, and at least one bolt assembly for fastening the first tensioning rail to the first side plate and to the at least one angle box of the first tensioning assembly. The system also includes a second tensioning assembly operatively connectable to the second side plate. The second tensioning assembly includes a second tensioning rail mountable to the inner surface of the second side plate and connectable to a second portion of the screen media, at least one angle box mountable to the outer surface of the second side plate, at least one bolt assembly for fastening the second tensioning rail to the second side plate and to the at least one angle box of the second tensioning assembly. Each bolt assembly includes a bolt connectable to one of the first and second tensioning rails, one of the first and second side plates and one of the angle boxes, a nut threadably engaged with the bolt for retaining the bolt to one of the angle boxes, and a shoulder bolt secured to a terminal end of the bolt. The shoulder bolt serves to prevent the nut from becoming physically separated from the bolt. Each angle box includes an aperture defined therein sized to allow the bolt assembly unobstructed passage therethrough, and a movable plate with a cutout formed therein. The cutout is sized larger than the bolt but smaller than the nut. The movable plate is movable between a bolt-securing position and a bolt-releasing position. In the bolt-securing position, the movable plate partially occluding the aperture in the angle box with the cutout aligned with the aperture in the angle box such that when one bolt of the bolt assembly is tightly fastened to the angle box with one nut of the bolt assembly, one of the first and second tensioning rails is drawn tightly against the inner surface of the first and second side rail thereby applying a tensile force to one of the first or second portions of the screen media. In the bolt-releasing position, the movable plate being positioned so as to provide unobstructed access to the aperture in the angle box such that the bolt assembly can be detached from the angle box without requiring disassembly of the bolt assembly.

In another broad aspect, there is provided a side tensioning assembly for retaining screen media to a side plate in a vibrating-type screening machine. The side plate has an aperture, an inner surface and an outer surface. The side tensioning assembly includes a tensioning rail mountable to the inner surface of the side plate and connectable to a portion of the screen media, at least one angle box connected to the outer surface of the side plate, and at least one bolt assembly for fastening the tensioning rail to the side plate and to the at least one angle box. The at least one bolt assembly includes a bolt connectable to the tensioning rail, the side plate and the at least one of angle box, a nut threadably engaged with the bolt for retaining the bolt to the at least one the angle box, and a shoulder bolt secured to a terminal end of the bolt. The shoulder bolt is sized to prevent the nut from becoming physically separated from the bolt. At least one angle box including a cutout formed therein sized larger than the bolt but smaller than the nut. The angle box is movable relative to the side plate between a bolt-securing position and a bolt-releasing position. In the bolt-securing position, the angle box partially occludes the aperture in the side plate with the cutout aligned with the aperture in the side plate such that when the bolt is tightly fastened to the angle box with the nut, the tensioning rail is drawn tightly against the inner surface of the side rail thereby applying a tensile force to the portion of the screen media. In the bolt-releasing position, the angle box is positioned so as to provide unobstructed access to the aperture in the side plate such that the bolt assembly can be detached from the side plate without requiring disassembly of the bolt assembly.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

Figure 1:
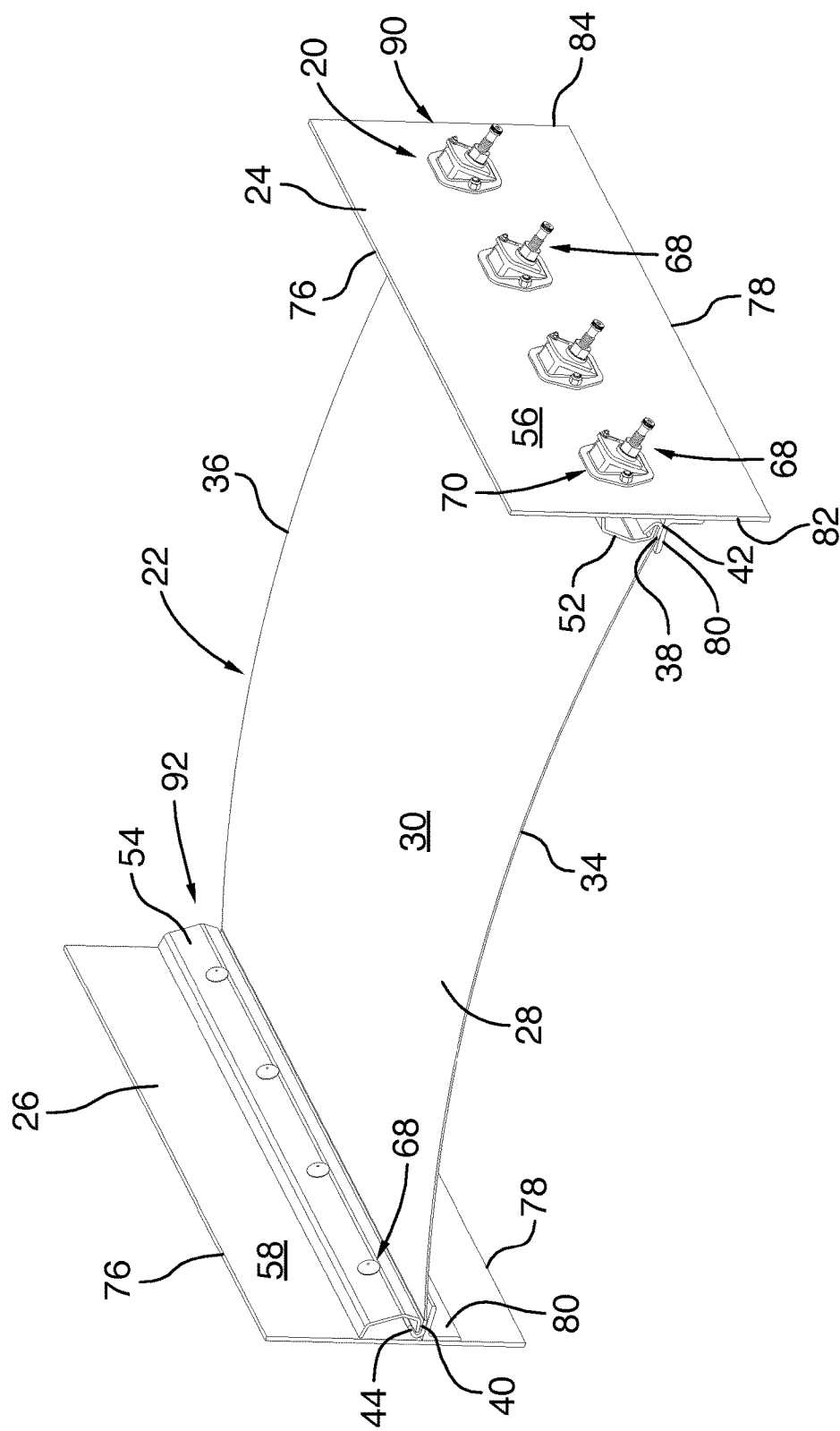
FIG. 1 is a top left perspective view showing a screen media panel being retained between a pair of opposed side plates of a vibrating-type screening machine by a side tensioning system having a first and second tensioning assemblies, according to an embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 21:
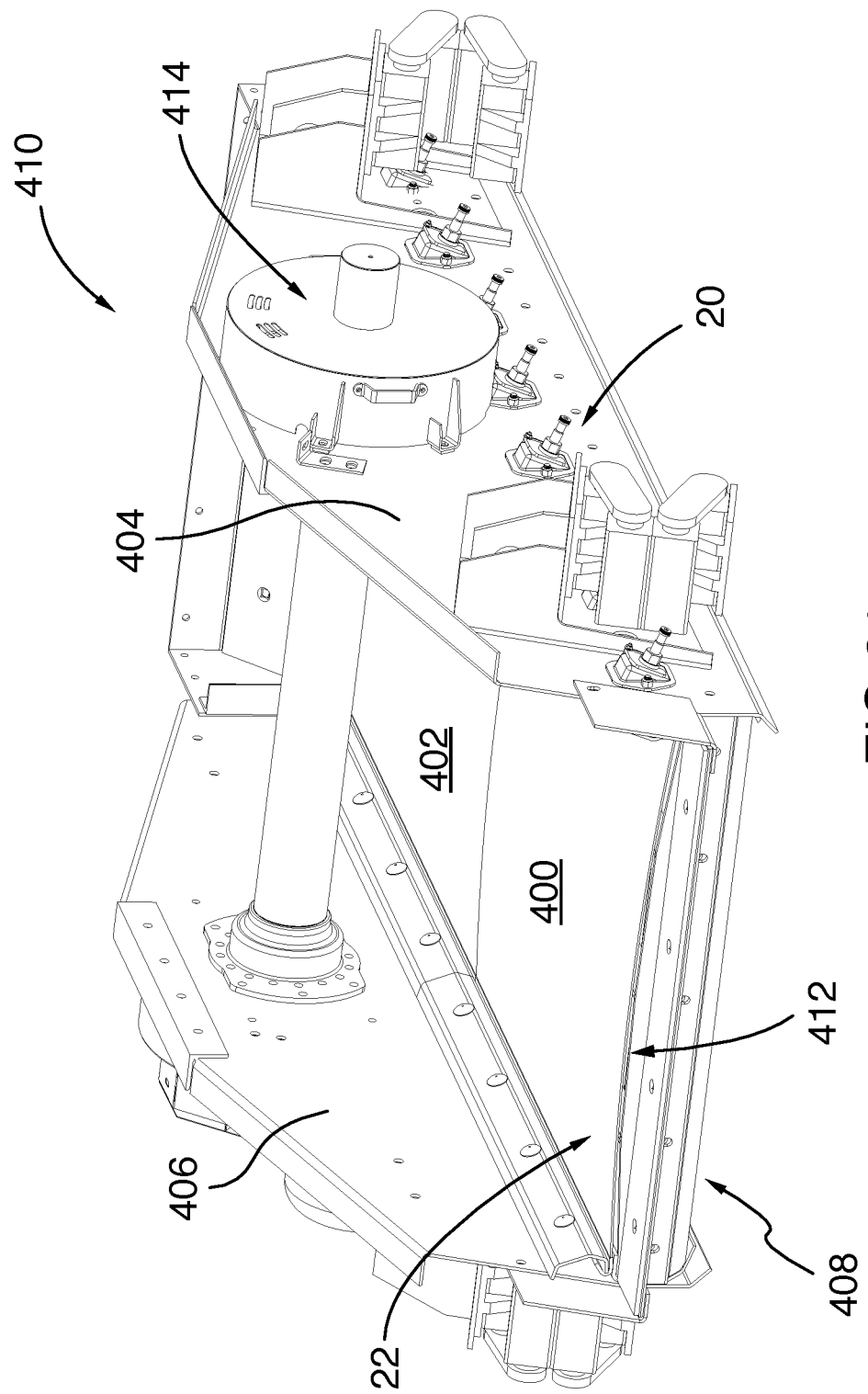
FIG. 21 is a top right perspective view of a vibrating-type screening machine employing they side tensioning system shown in FIG. 1.

Referring to FIG. 21, there is shown a side tensioning system generally designated with reference numeral 20. The side tensioning system 20 is used to securely tie, hold or retain screen media 22 (in the nature of two screen media panels 400 and 402 disposed side-by-side) between two opposing side plates 404 and 406 attached to a frame 408 of a vibrating-type screening machine 410. The frame 408 includes a single deck frame 412 which extends between the side plates 404 and 406 and which serves to support the screen media panels 400 and 402. The frame 408 is operatively connected to a mechanism 414 that is operable to impart vibratory movement to the frame 408 (and the side plates 404 and 406), in a manner known to those skilled in the art such that no further description is required. It should be appreciated that the vibrating-type screening machine 406 shown in FIG. 21 is provided merely as an example of the type of screening machine which could employ the tensioning system 20. It is not intended that use of the tensioning system 20 be limited to the vibrating-type screening machine 406 shown in FIG. 21. The tensioning system 20 could be employed with other vibrating-type screening machines.

Figure 2:
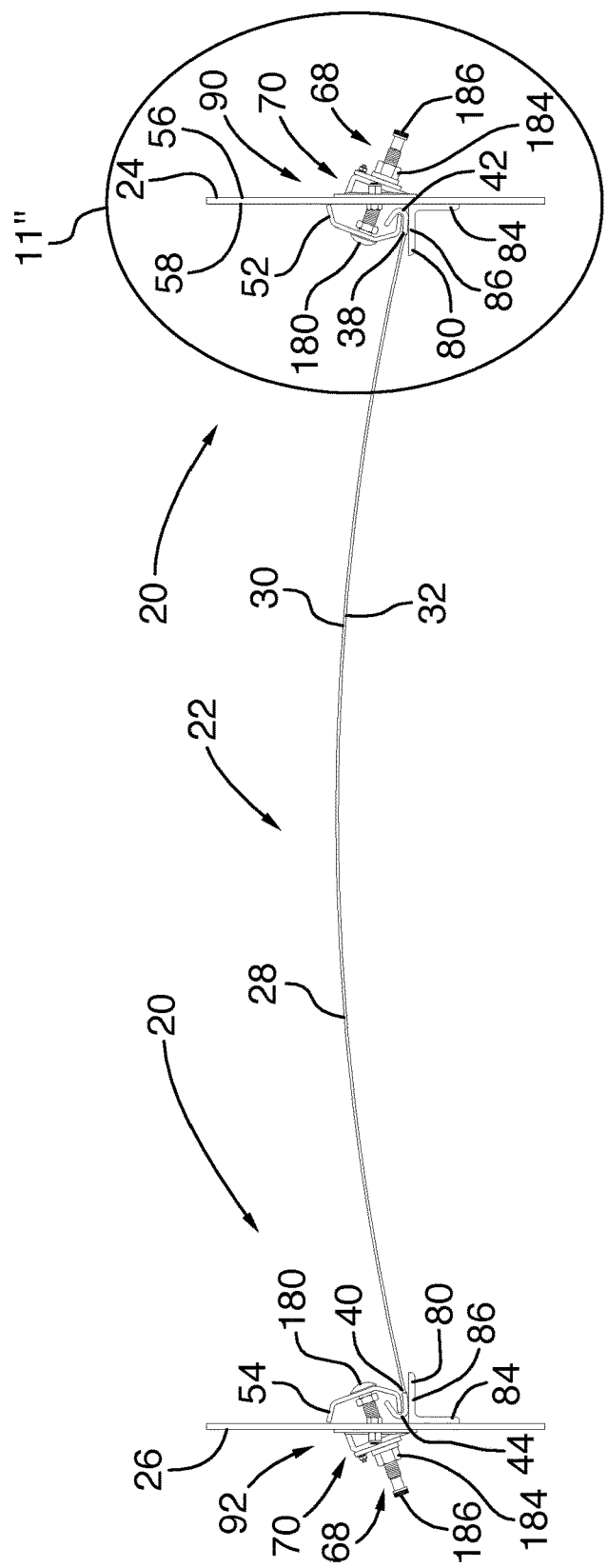
FIG. 2 is a side elevation view of the screen media, the side plates and the first and second tensioning assemblies shown in FIG. 1.
Figure 3:
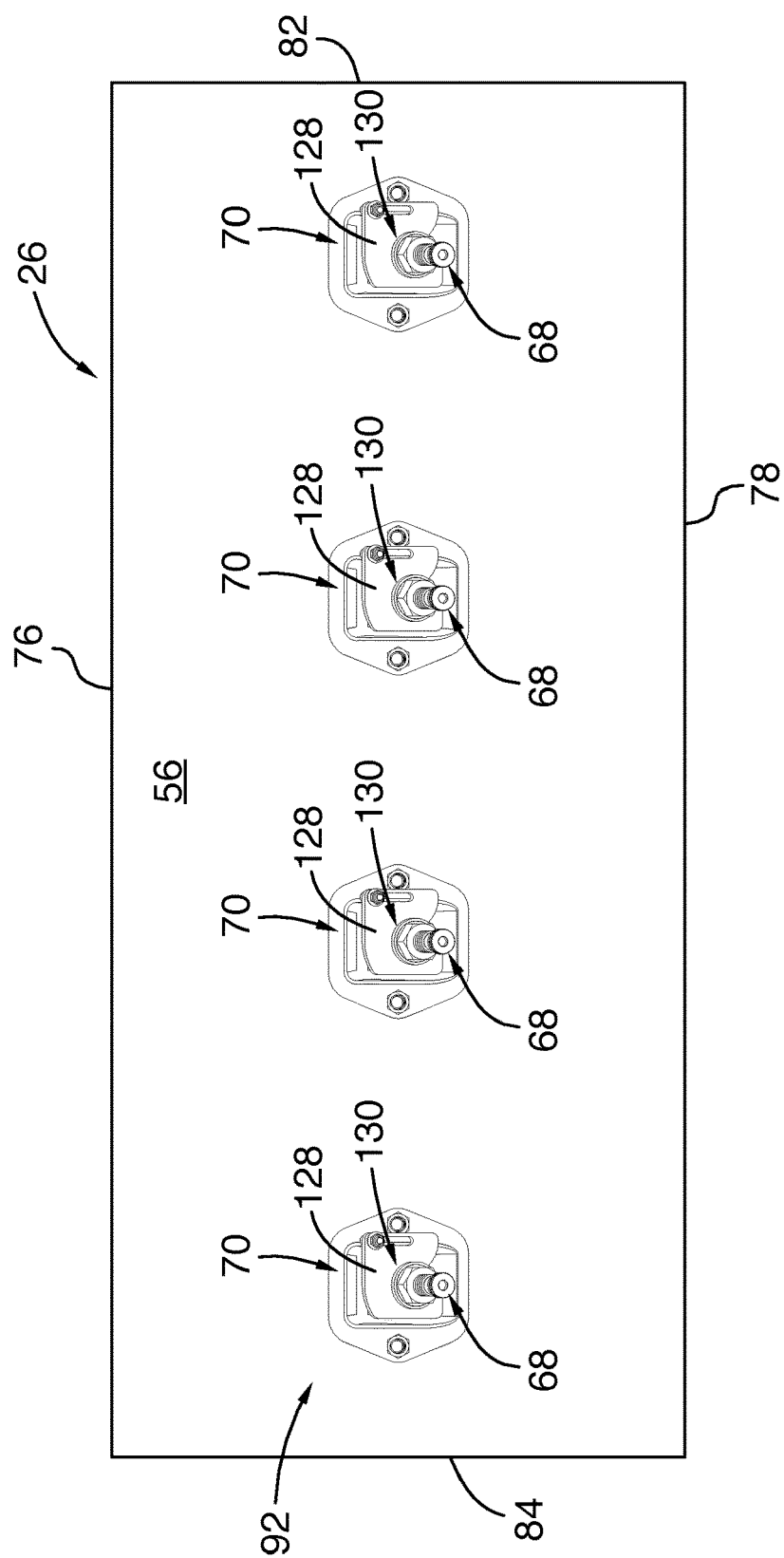
FIG. 3 is an end view of the screen media, the side plates and the second tensioning assembly in FIG. 1.

For purposes of better illustrating the invention and facilitating the description thereof, the side tensioning system 20 is shown in FIGS. 1 to 3 mounted between two side plates 22 and 24. The side plates 22 and 24 are intended to be simplified representations of the side plates 400 and 402, with extraneous components removed so as not distract from the comprehension of the invention. Accordingly, the description of the side tensioning system 20 that follows below is made with reference to side plates 24 and 26.

In the embodiment shown in FIGS. 1 to 3, the screen media 22 takes the form of a single screen media 28 fabricated from wire cloth. In other embodiments, the screen media panel could be made of rubber, polyurethane, metal or other suitable materials selected based on the particular application and material to be screened. The screen media panel 28 provided with a plurality of apertures (not shown) of a predetermined size selected based on the desired material to be screened.

The screen media panel 28 includes a top surface 30 and a bottom surface 32, and has a generally rectangular shape when seen in plan view, which is defined by a pair of relatively long, opposed edges 34 and 36 and a pair of relatively short, opposed edges 38 and 40. Affixed to each opposed short edge 38 and 40, is a generally U-shaped tensioning hook 42, 44, respectively. Each hook 42, 44 has a first arm portion 46, a second arm portion 48 and intermediate portion 50 which joins the first arm portion 46 to the second arm portion 48 (as bets shown in FIG. 11). The first arm portion 46 serves as an anchor point for the long edge 34 or 36 of the screen media panel 28. The second arm portion 48 is oriented to extend away from the top surface 30 of the screen media panel 28. As will be explained in greater detail below, tensioning rails 52 and 54 which form part of the side tensioning system 20 will engage the intermediate portions 50 of the tensioning hooks 42 and 44 to tightly retain the screen media panel 28 in position, on a suitable support structure (not shown, but generally similar to the deck frame 412 shown in FIG. 21) and between the side plates 24 and 26. When thus retained, the screen media panel 28 bulges slightly upwardly, its top surface 30 adopting a gentle convex contour shaped by the support structure.

Figure 4:
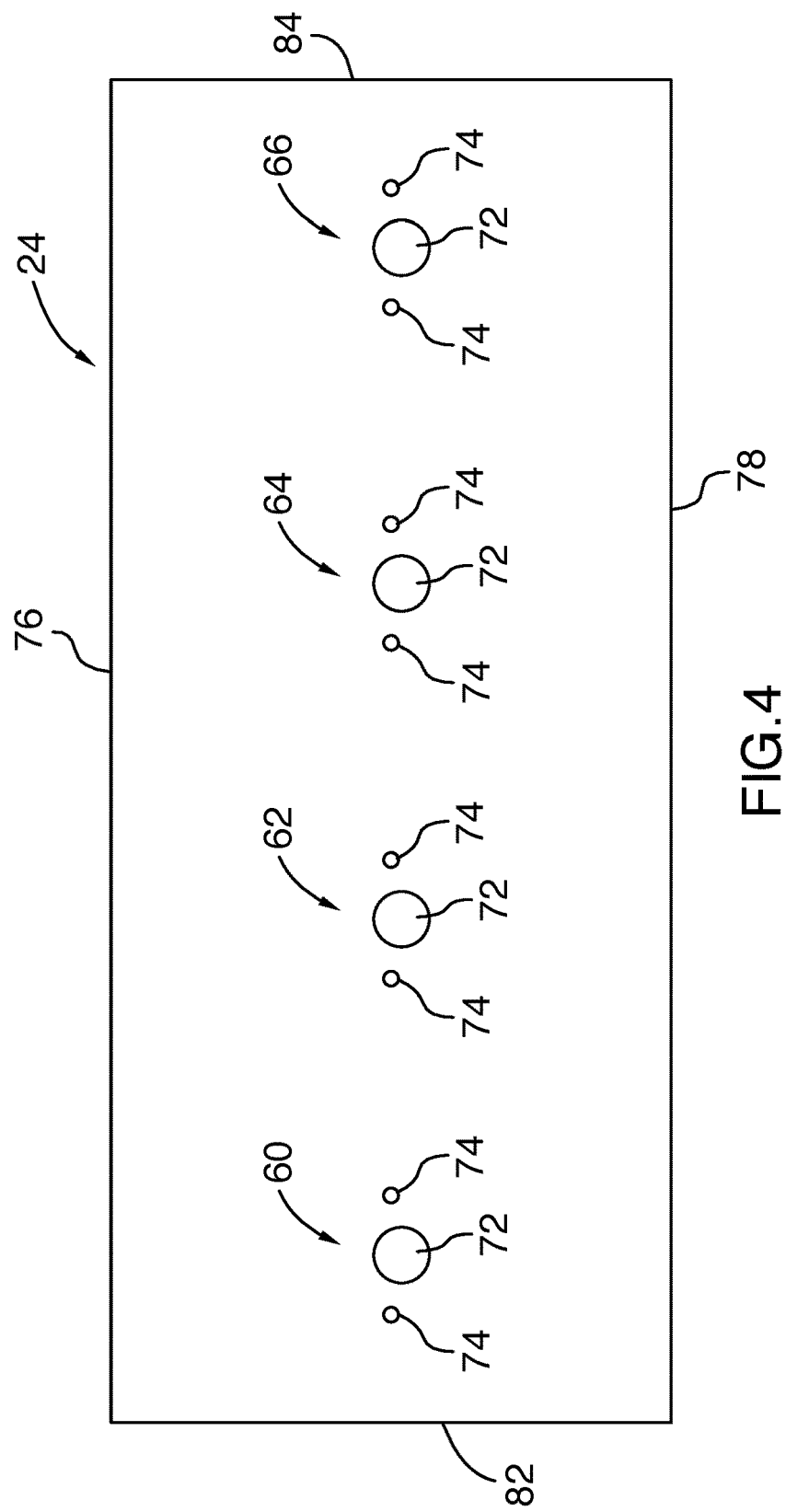
FIG. 4 is an isolated end view of one of the side plates shown in FIG. 1.

Referring now to FIGS. 2 and 4, each side plate 24, 26 is rectangular and has an outer surface 56 and an inner surface 58. Each side plate 24, 26 is further provided with a series of differently-sized apertures formed therein disposed in a particular arrangement. More specifically, such apertures are arranged in four distinct aperture groupings 60, 62, 64 and 66 with each aperture grouping being associated with one bolt assembly 68 and one angle box 70 which form part of the side tensioning system 20. Each grouping 60, 62, 64 and 66 includes a relatively, large central aperture 72 flanked on either side by a relatively small aperture 74. The central apertures 72 are located roughly midway between the top and bottom edges 76 and 78 of each side plate 24, 26 and the small apertures 74 are offset from the central aperture 72 such that they are disposed above center of the aperture 72. It will be appreciated that apertures 72 and 74 formed on actual side plates (such as side plates 404 and 406) of a vibrating-type screening machine would be located above the bottom edge of the side plate, and not necessarily midway between the top and bottom edges.

In other embodiments, the number of aperture groupings could be increased or decreased as necessary to accommodate a greater or lesser number of bolt assemblies and angle boxes.

Welded to the inner surface 58 of each side plate 24 and 26 at a location below the aperture groupings 60, 62, 64 and 66, is a longitudinal angle member 80. Each angle member 80 extends from one lateral edge 82 of the side plate 24, 26 to the other lateral edge 84 (see FIGS. 2 and 11). It will be appreciated that in an actual vibrating-type screening machine the angle members would be provided in sections and would not necessarily extend from one lateral edge of a side plate to another. This can be seen in the vibrating-type screening machine shown FIG. 21 where two screen media panels 400 and 402 and their associated tension rails are arranged side-by-side.

Each angle member 80 includes a first arm 84 and a second arm 86 joined to the first arm 84. The first arm 84 abuts the inner surface 58 of the side plate 24, 26, while the second arm 86 projects from the inner surface 58 to define a horizontal shelf 88 (labelled on FIG. 11) which supports the tensioning hook 42, 44 when the screen media panel 28 is secured top the side plates 24 and 26 by the tensioning system 20.

Referring to FIG. 2, the side tensioning system 20 can be seen to have a first tensioning assembly 90 associated with side plate 24 and a second tensioning assembly 92 associated with side plate 26. The first tensioning assembly 90 includes the tensioning rail 52, a plurality of bolt assemblies 68 and a corresponding plurality of angle boxes 70 (visible in FIG. 1). Similarly, the second tensioning assembly 92 includes the tensioning rail 54, a plurality of bolt assemblies 68 and a corresponding plurality of angle boxes 70 (visible in FIG. 3). In the embodiment shown in FIG. 1, each tensioning assembly 90, 92 has four bolt assemblies 68 and four angle boxes 70. In other embodiments, the tensioning assemblies could be provided with a greater or lesser number of bolt assemblies and angle boxes.

The first and second tensioning subassemblies 90 and 92 are identical to each other in all respects, except that they are deployed in a mirror image configuration on the side plates 24 and 26. Accordingly, for the purposes of this specification, it will suffice to describe the first tensioning assembly 90 only and such description will be equally applicable to the second tensioning assembly 92.

With reference to FIGS. 5A, 5B, 5C and 6, the angle box assembly 70 will now be described in greater detail. The angle box 70 has a roughly hexagonal, flanged, base portion 94 which can be considered to form the back of the angle box and a hollow, wedge like structure 96 which projects from the base portion 94 and is integrally formed therewith, and can be understood to form the front of the angle box. The angle box 70 is not fully closed, its back is open to allow access to the space S defined by the wedge-like structure 96 (visible in FIG. 6).

In this embodiment, the flanged base portion 94 is shown be distinct from the wedge-like structure 96. This need not be the case in every application. In alternative embodiments, the angle box could be formed without a defined flange portion. For example, it may be possible to replace the flange portion with mounting tabs or simply configure the wedge-like structure to attach directly to the side plate. Other modifications to the angle box are possible and the application of the principles of the present invention is not limited to those angle boxes illustrated in the drawings.

Figure 5A:
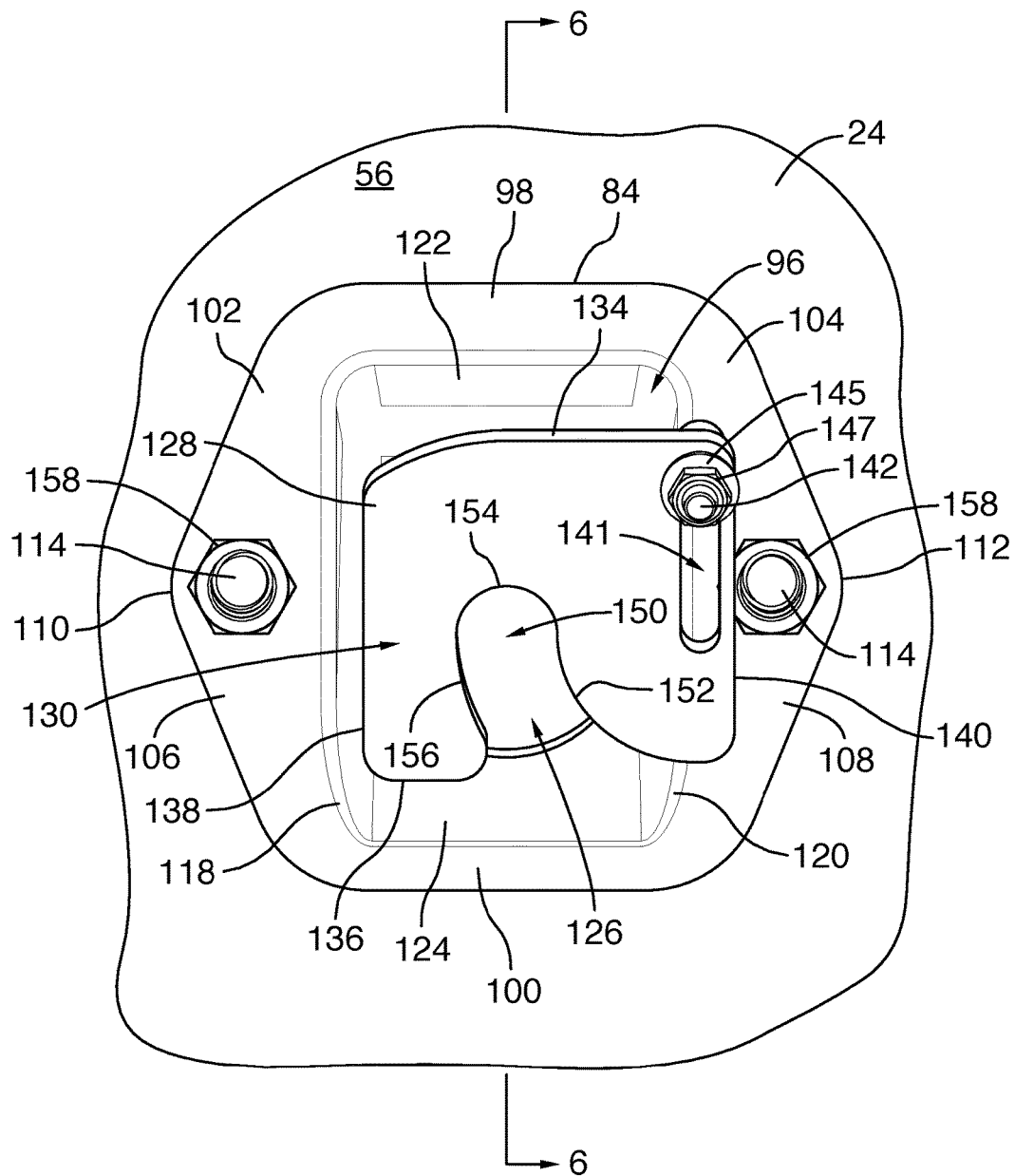
FIG. 5A is a magnified end view of an angle box of the first tensioning assembly illustrated in FIG. 1 shown mounted to a portion of the side plate with a movable plate of the angle box occupying a bolt-securing position.

As best shown in FIG. 5A, the base portion 94 is defined by a top flange portion 98, a bottom flange portion 100, a pair upper lateral angled flange portions 102 and 104, and a pair of lower lateral angled flange portions 106 and 108. The top flange portion 108 extends between the upper lateral flange portions 102 and 104. The flange portions 102 and 104 extend downwardly away from the top flange 108 in a diverging manner. The upper lateral flange portion 102 meets the lower lateral flange portion 106 at a first juncture 110 and similarly, the upper lateral flange portion 104 joins the lower lateral flange portion 108 at a second juncture 112. The bottom flange portion 110 extends between the lower lateral flange portions 106 and 108.

Adjacent each juncture 110, 112, the base portion 94 has apertures (not shown) which are alignable with the small apertures 74 of an aperture grouping in one of the side plate 24 and 26. The apertures formed in the base portion 94 are sized to receive small bolts 114 therethrough to permit the angle box 70 to be securely mounted to side plate 24.

Figure 5B:
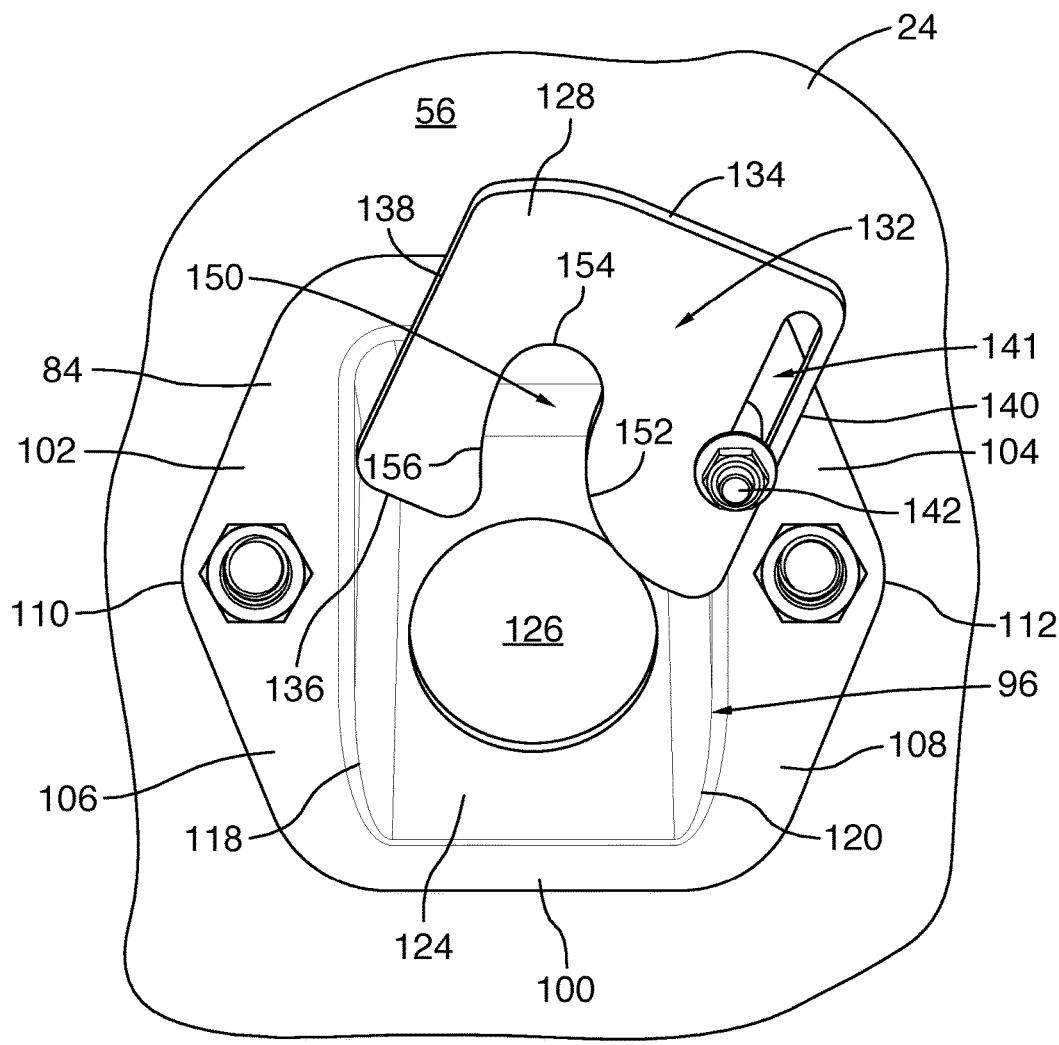
FIG. 5B is another magnified end view of the angle box and the side plate similar to that illustrated in FIG. 5A, except that the movable plate is now shown occupying a bolt-releasing position.
Figure 6:
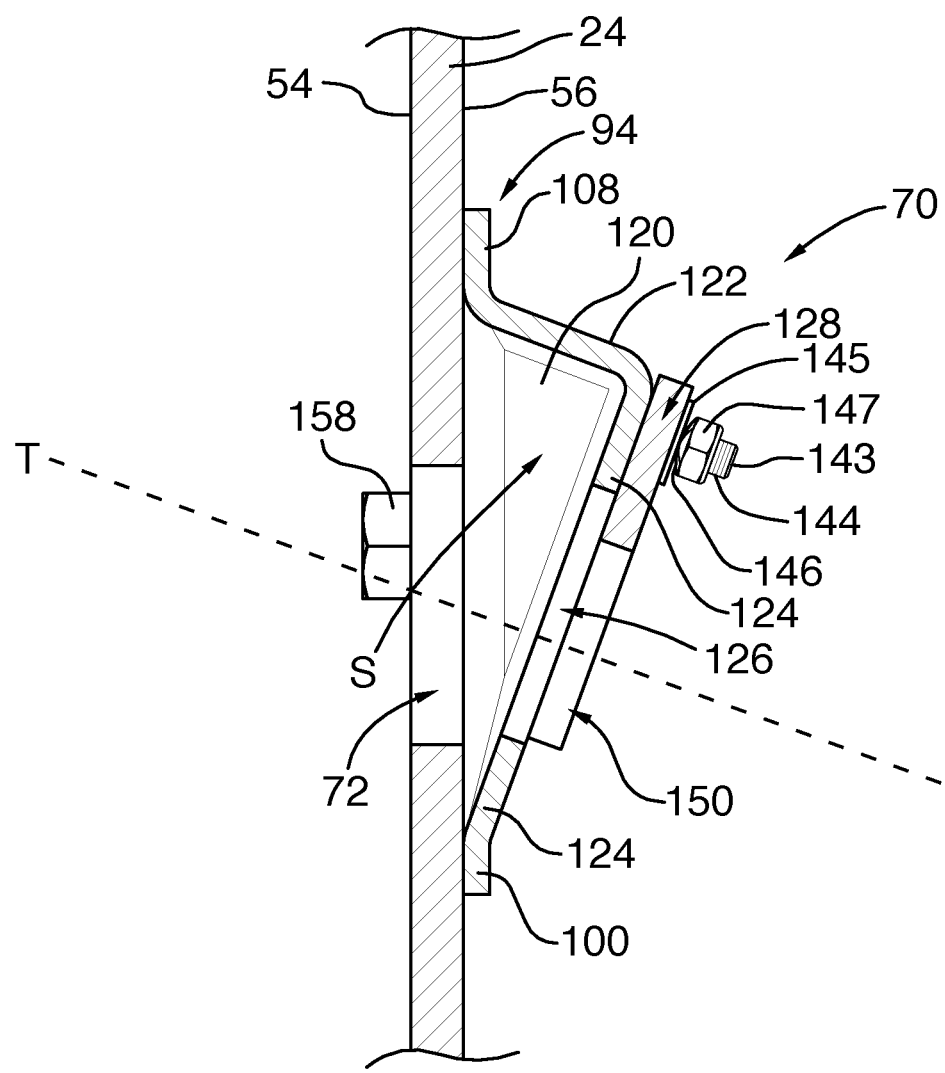
FIG. 6 is a cross-sectional view of the angle box and side plate shown in FIG. 5A taken along line "6-6"

As best shown in FIG. 6, the wedge-like structure 96 is defined by two, spaced apart, lateral triangular portions 118 (visible in FIGS. 5A and 5B) and 120, a relatively short, upper wall 122 and a relatively long, lower wall 124. The lateral triangular portions 118 and 120 stand proud of the base portion 94. The lateral triangular portion 118 bounds and joins the upper wall 122 and the lower wall 124 on one side, while the lateral triangular portion 120 bounds and connects to the upper wall 122 and the lower wall 124 on the opposite side. The upper wall 122 extends forwardly of the base portion 94 at a slight decline angle as measured from a notional horizon. The lower wall 124 meets with the upper wall 122 where the latter terminates. The lower wall 124 extends downwardly from the upper wall 122 at a right angle to join the base portion 94. A large circular aperture 126 is defined in the lower wall 124. It opens onto, and provides access to, the space S defined by the wedge-like structure 96. The aperture 126 is sized larger than the largest width dimension of the bolt assembly 68 along its entire length (i.e. larger than the diameter of the flange nut 184) so that the bolt assembly 68 can freely pass through the aperture 126 unhampered without disassembly. In this embodiment, the diameter of the aperture 126 measures 2 in. In other embodiments, the aperture 126 could be sized or configured differently. For example, in alternative embodiments, the aperture could be oval, oblong, square, rectangular, or a different shape, provided the size of the aperture remains larger than the largest width dimension of the bolt assembly 68 along its entire length (i.e. larger than the diameter of the flange nut 184).

It should be appreciated that the sizing of the aperture 126 to be larger than the largest width dimension of the bolt assembly 68 along its entire length, represents a stark departure from prior art angle boxes in known tensioning assemblies. Such angle boxes are typically provided with an oblong aperture which is sized sufficiently large to allow insertion therethrough of a bolt, but is not large enough to allow the arrangement of washer and nut used to fasten the bolt to fit through the oblong aperture. As a result of this design, this type of known tensioning assembly requires the arrangement of washer and nut to be disengaged (and physically separated) from the bolt, before the bolt can be removed from the angle box—thereby leading to loose parts.

The angle box 70 is further provided with means for securing the bolt assembly 68 and preventing it from disengaging from the angle box 70. In this embodiment such bolt securing means are embodied in a movable plate in the nature of a swiveling plate 128 which may be moved between a bolt-securing position 130 and a bolt-releasing position 132. The swiveling plate 128 has a vaguely square shape which is defined by an upper margin 134, a lower margin 136 and opposed lateral margins 138 and 140 which run between the upper and lower margins 134 and 136, joining one to the other. In other embodiments, the swiveling plate could be shaped differently.

At a location adjacent the lateral margin 140 proximate to where the lateral margin 140 meets the upper margin 134, a narrow oblong slot 141 is cut into the swiveling plate 128. The oblong slot 141 runs more than midway down the lateral margin 140, but does not extend as far as the corner defined by the juncture of the lateral margin 140 and the lower margin 136. The oblong slot 141 serves as a track for guiding the movement of the swiveling plate 128 relative to a pivot pin 142 retained therein. As best shown in FIG. 5C, the pivot pin 142 has a threaded top portion 143 and an unthreaded bottom portion 144 which is of larger diameter than the top portion 143. The bottom portion 144 is welded to the wedge-like structure 96 at a site along the lateral triangular portion 120. The top portion 143 of the pivot pin 142 is captively retained within the slot 141 by a washer 145, a wave washer 146, and a nut 147. In other embodiments, the pivot pin 142 could be attached to the wedge-like structure 96 at a different site, for instance, at a site located along the lateral triangular portion 118. As explained in greater detail below, it is the oblong slot 141 and pivot pin 142 arrangement which allows the swiveling plate 128 to travel between a bolt-securing position 130 and a bolt-releasing position 132.

A rather significant, elongated cutout 150 having a shape not unlike that of a thumb when viewed in profile, is formed within the swiveling plate 128. The cutout 150 bites deeply into the lower margin 136 at a location roughly midway between the lateral margins 138 and 140, and extends upwardly about halfway into the swiveling plate 128. The shape of the cutout 150 can be seen to be defined substantially by edge portions 152, 154 and 156. The edge portion 152 extends from the lower margin 136 generally upwardly and away from the lateral margin 140 in a manner that follows a large smoothly-radiused contour. The edge portion 152 terminates where the semi-circular edge portion 154 begins. The edge portion 156 extends downwardly from the edge portion 154 curving in gently toward the lateral margin 138 as it nears the lower margin 136. The width of the cutout 150 is larger than the diameter of the threaded portion of a carriage bolt 180 of the bolt assembly 68, but it is sized smaller than a flange nut 184 of the bolt assembly 68.

Referring to specifically FIG. 5A, when the swiveling plate 128 is in the bolt-securing position 130, the pivot pin 142 is at the top end of the oblong slot 141, the swiveling plate 128 is superimposed over the lower wall 124 of the wedge-shaped structure 96 such that it substantially overlaps with it and significantly occludes the central aperture 126 formed in the lower wall 124. As a result, the opening defined by the central aperture 126 is severely constricted, and is now reduced to the size of the cutout 150.

Figure 5C:
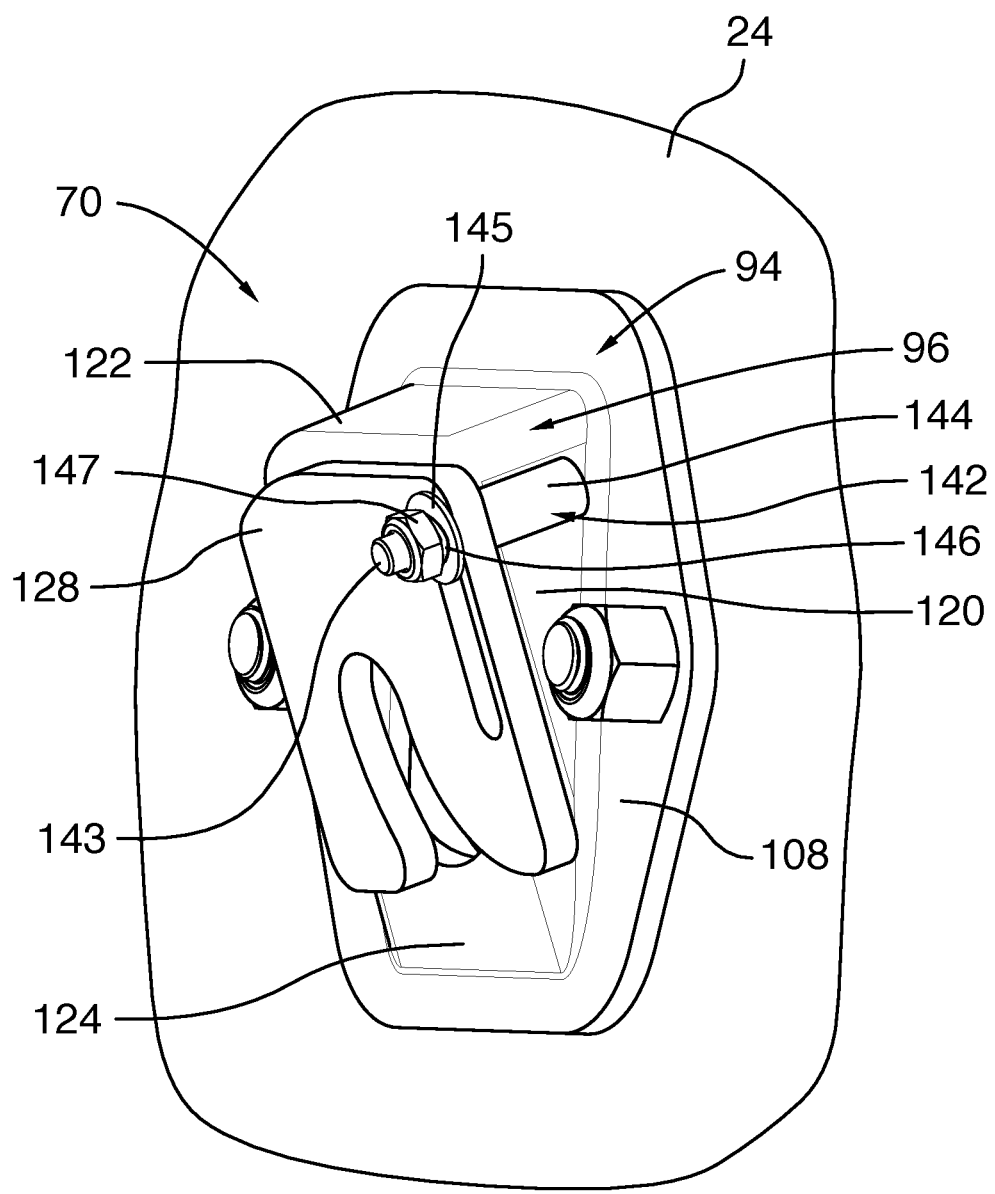
FIG. 5C is a perspective view of the angle box and side plate shown in FIG. 5A.

Referring specifically to FIG. 5B, to move the swiveling plate 128 to the bolt-releasing position 132, the swiveling plate 128 is urged to slide upwards while being pivoted in a clockwise direction approximately 45 degrees relative to a notional vertical axis until the bottom end of the oblong slot 141 abuts the pivot pin 144. At that point the swiveling plate 128 no longer occludes the central aperture 126 formed in the lower wall 124, leaving the opening defined by the central aperture 126 fully exposed to revert back to its full size.

During assembly of the side tensioning system 20, the angle box 70 is placed on the side plate 24 with the flange portions 98, 100, 102, 104, 106 and 108 abutting the outer surface 56 of the side plate 24 or 26. The apertures adjacent each juncture 110 and 112 are aligned with the apertures 74 of an aperture grouping in one of the side plate 24 and 26 and small bolts 114 are inserted through the aligned apertures such that the free ends protrude beyond the outer surface 56 of the side plate 24. The free ends of the bolts 114 are then secured with nuts 158. While the angle box 70 can be replaced in the event of excessive wear and tear or damage, it is not intended that the angle box be detached from the side plate 24 or 26 when replacing the screen media 22.

When the angle box 70 is mounted to the side plate 24, the aperture 126 in the angle box 70 aligns with one of the apertures 72 in the side plate 24 or 26 along a line T (shown in FIG. 6) which represents the direction of the tensioning force applied by the side tensioning system 20.

Figure 7:
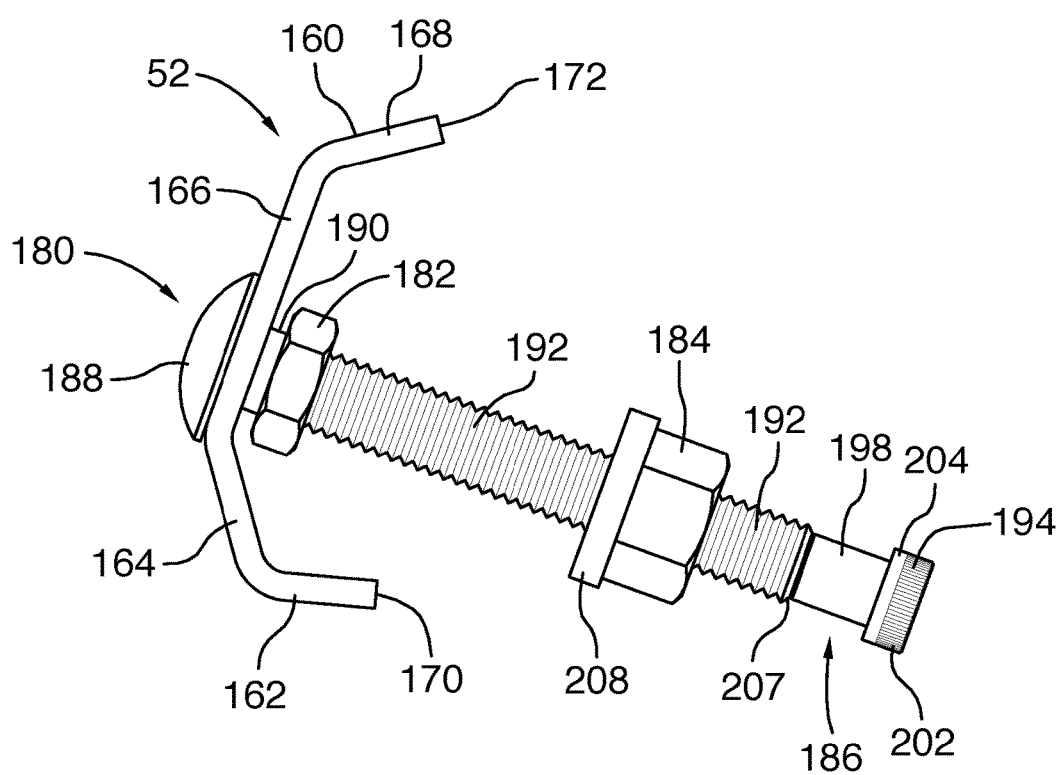
FIG. 7 is an isolated and magnified, side elevation view of a bolt assembly of the first tensioning assembly illustrated in FIG. 1 shown connected to a tensioning rail.

Referring now to FIG. 7, the tensioning rail 52 is described. The tensioning rail 52 is a longitudinal sheet member 160 formed with a plurality of bent portions—namely, first lower bent portion 162, second intermediate bent portion 164, a third intermediate portion 166, and a fourth upper bent portion 168. The first lower bent portion 162 is relatively short and can be seen to extend at a gentle incline upwardly toward the second intermediate bent portion 164. When the tensioning system 20 is deployed, it is the terminal end 170 of the first lower bent portion 162 that engages with the tensioning hook 42, 44 of the screen media 28.

At the juncture where the first lower bent portion 162 meets the second intermediate bent portion 164, the sheet member 160 bends sharply upwards and away from the first lower bent portion 162. The second intermediate bent section 164 is disposed between the first and third bent portions 162 and 166. The third intermediate portion 166 is the longest portion and it is formed by bending the sheet member 160 back in the direction of the first lower bent portion 162. Defined in the third intermediate bent portion 166 at a location slightly away from the site where the second and third bent portions 164 and 166 meet, are a plurality of square apertures (not shown). In this embodiment, the plurality of square apertures includes four square apertures—the number of square apertures corresponds to the number of bolt assemblies 68 included in the first tensioning assembly 90. The center-to center spacing between each square aperture is corresponds to the center-to center spacing of the central apertures 72 formed in the side plate 24. The square aperture is sized to accommodate therein a portion of the bolt assembly 68 that has a correspondingly square cross-section.

The sheet member 160 is bent one final time still towards the first lower bent portion 162 to create the fourth upper bent portion 168. When the tensioning system 20 is deployed, it is the terminal end 172 of the fourth upper bent portion 162 that bears against the inner surface 58 of the side plate 24.

Figure 8:
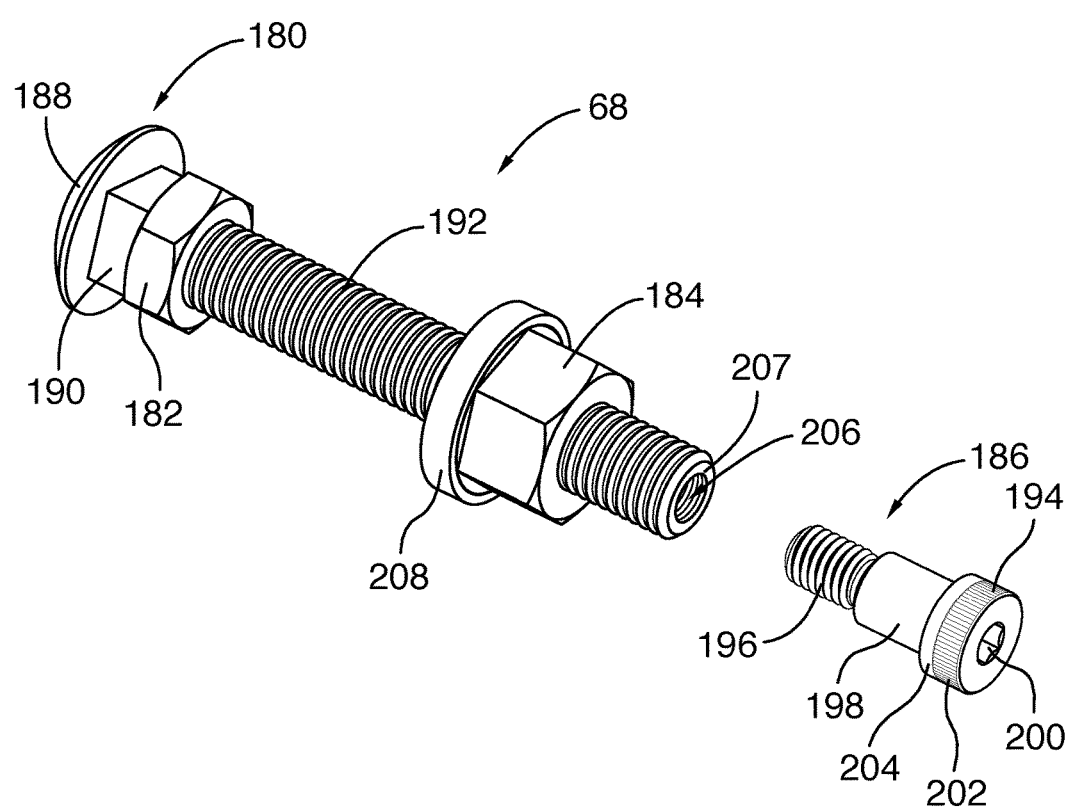
FIG. 8 is an isolated perspective view of the bolt assembly showing the carriage bolt exploded from the shoulder bolt.

Referring now to FIGS. 7 and 8, the bolt assembly 68 includes a carriage bolt 180, a half nut 182, a flange nut 184 and a shoulder bolt 186. The carriage bolt 180 has a rounded bolt head 188, a neck portion 190 disposed immediately adjacent the bolt head 188 and a shank portion 192. The neck portion 190 has as square cross-section which is sized to fit in the square apertures defined in the third intermediate bent portion 166 of the sheet member 160. The shank portion 192 extends away from the neck portion 190. The shank portion 192 is threaded along its entire length to allow the half nut 182 and the flange nut 184 to travel therealong. In this embodiment, the carriage bolt is 5.5 in. long and the diameter of its shank portion 192 is 0.75 in. In other embodiments, a different size carriage bolt could be used.

In contrast to the bolts used in some prior art side tensioning assemblies, the carriage bolt 180 is formed with a blind threaded bore 206 which extends into the terminal end 207 of shank portion 192. The blind bore 206 is adapted to receive a portion of the shoulder bolt 186.

While it is generally preferred that a carriage bolt be used, in other embodiments, different types of bolts could be used in the bolt assembly.

The half nut 182 serves to secure the carriage bolt 180 to the tensioning rail 52 and to ensure that when disconnecting the screen media from the side plates 24 and 26 for replacement, the tensioning rail 52 remains adjacent the bolt head 188 and does not travel along the carriage bolt 180. When assembling the bolt assembly 68 to the tensioning rail 52, the half nut 182 is tightened up against the neck portion 190. While it is generally preferred that the bolt assembly include the half nut 182, in certain alternative embodiments, the half nut could be omitted from the bolt assembly.

As will be explained in greater, the flange nut 184 in collaboration with the carriage bolt 180, the tensioning rail 52 and the angle box 70 serves to create the tension that holds the screen media 22 in place between the side plates 22 and 24. More specifically, the flange nut 184 can be made to travel along the threaded shank portion 192 of the carriage bolt 180 and urged to abut the swiveling plate 128 when it is in its bolt-securing position 130. By tightening the flange nut 184, the carriage bolt 180 is placed in tension and the tensioning rail 52 is further drawn into the side plate 24 causing the screen media panel 28 to be more tautly held.

In this embodiment, the flange nut 184 replaces the separate washer and nut arrangement used in known tensioning systems, thereby reducing the number of parts which make up the fastening hardware of the tensioning system. The flange nut 184 is sized smaller than the diameter of the central aperture 126 in the wedge-shaped structure 96 such that when the flange nut 184 is threaded onto the shank portion 192 and the swiveling plate 128 is in its bolt-releasing position 132, the carriage bolt 180 can be easily pulled out of the angle box 70. However, the size of the flange nut 184 is greater than the size of the cutout 150 such when the bolt assembly 68 is fitted into the angle box 70 and the swiveling plate 128 is in the bolt-securing position 130, the flange nut 184 blocks the carriage bolt 180 from being pulled out of the angle box 70. In this embodiment, the width of the flange nut 184 is 1.62 in. In other embodiments, the flange nut could be replaced with another suitable nut or with a nut and a washer.

The shoulder bolt 186 includes a bolt head portion 194, a threaded shank portion 196 and an unthreaded shoulder portion 198 disposed between portions 194 and 196. Integrally formed within the bolt head portion 194 is a hex socket 200. The bolt head portion 194 is also provided with wraparound knurling 202. The diameter of the shoulder portion 198 is smaller than that of the bolt head portion 194 such that it defines a flange 204. The diameter of the threaded shank portion 196 is smaller than that of the shoulder portion 198. The threaded shank portion 196 is sized to mate with the blind threaded bore 206 formed in the shank portion 192 of the carriage bolt 180.

With the diameter of the bolt head portion 194 being sized larger than the diameter of the apertures (not shown) formed in the half nut 182 and the flange nut 184, when the shoulder bolt 186 is attached to the carriage bolt 180, the flange 204 formed in the shoulder bolt 186 prevents both the flange nut 184 from getting physically separated from the bolt assembly 68. Should the the flange nut 184 become disengaged from the shank portion 192 of the carriage bolt 180, it would slide onto the shoulder portion 198 of the shoulder bolt 186 and be captively retained on the shoulder bolt 186 by the flange 204 defined by the bolt head portion 194. As a further advantage, the shoulder portion 196 of the shoulder bolt 186 provides a structure about which the flange nut 18 may freely spin in the event that the tool used to disengage the flange nut 184 continues to impart rotary motion to the flange nut 184 once it has become disengaged from the threaded shank portion 192 of the bolt 180.

As a result, this arrangement permits the tensioning rail 52 and fastening hardware associated therewith to be removed or installed (as the case may be) as a single component or unit, without having a plurality of loose parts floating around when replacing the screen media 22 as is the case with prior art tensioning systems. Since the fastening hardware does not need to be assembled or disassembled every time the tensioning assembly is installed or removed, the deployment or removal process tends to be more streamlined and simplified. Significant time savings can be realized. Moreover, because of such efficiencies, where a tensioning system in accordance with the principles of the present invention is employed, it is now possible for a single workman to carry out install or remove screen media. As an additional benefit, since the fastening hardware is no longer physically separated from the bolt assembly, it tends not to get lost and require replacement, leading to cost savings in respect of spare parts.

The following is a short description of how the bolt assembly 68 attaches to the tensioning rail 52. First, the carriage bolt 180 is inserted into one of the square apertures (not shown) defined in the sheet member 160 until the bolt head portion 194 of the carriage bolt 180 abuts the third intermediate bent portion 166 and the neck portion 190 is securely received in the square apertures. Thereafter, the half nut 182 is threaded onto the carriage bolt 180 and urged to travel until it abuts the neck portion 190 of the carriage bolt. Next, the flange nut 184 is threaded onto the carriage bolt 180. As a final step, the shoulder bolt 186 is fastened onto the terminal end 206 of the shank portion 192.

Figure 9:
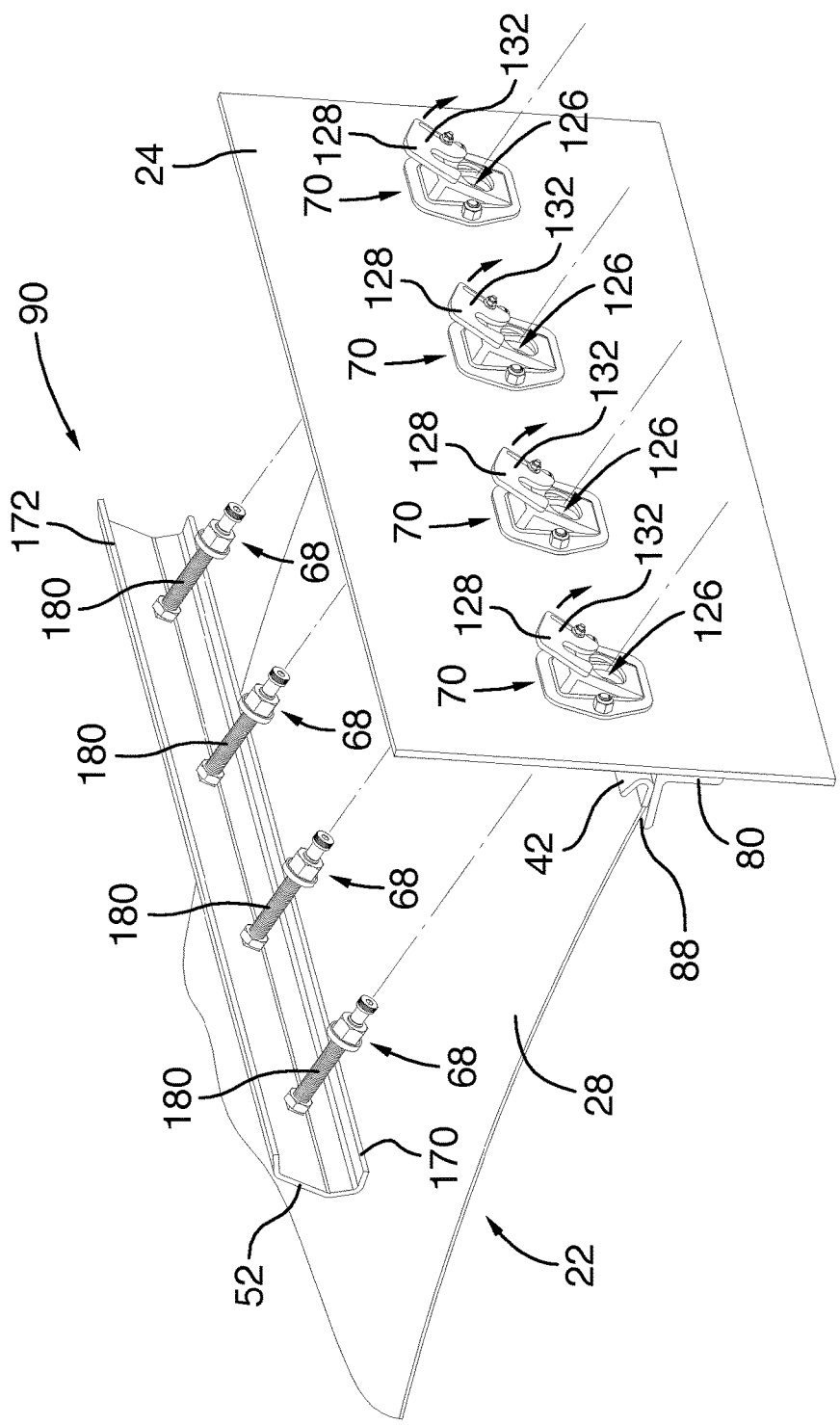
FIG. 9 is a partially exploded, top left perspective view showing the screen media and a plurality of angle boxes of the first tensioning assembly carried on the side plate shown in FIG. 1 with the tensioning rail and a plurality of bolt assemblies exploded therefrom.
Figure 10A:
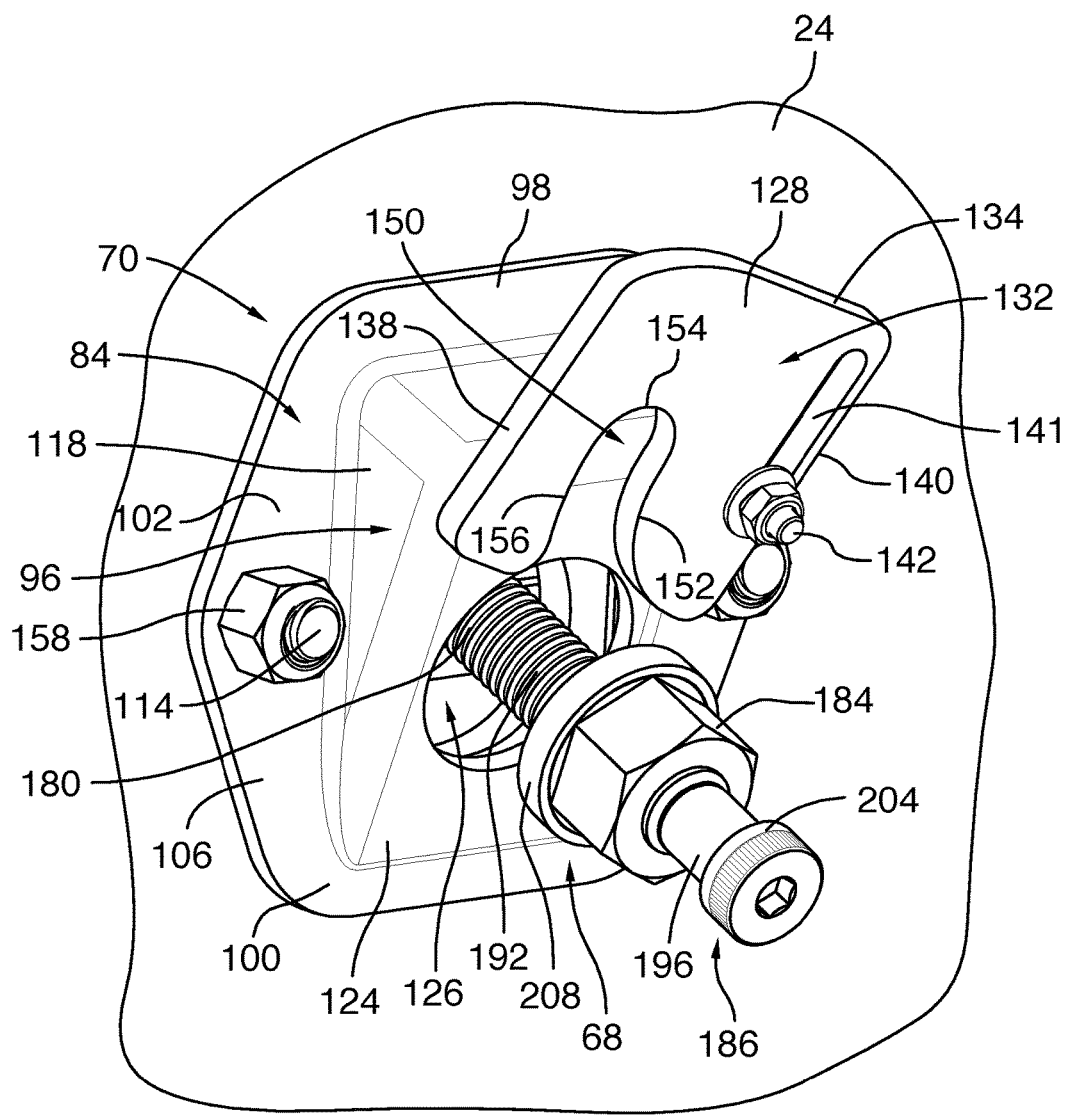
FIG. 10A is a magnified perspective view of one of the plurality of angle box assemblies illustrated in FIG. 9 showing the angle box receiving a bolt therethrough, the flange nut on the bolt being loosened so as to provide clearance between the flange nut and the movable plate, and the movable plate occupying the bolt-releasing position.
Figure 10B:
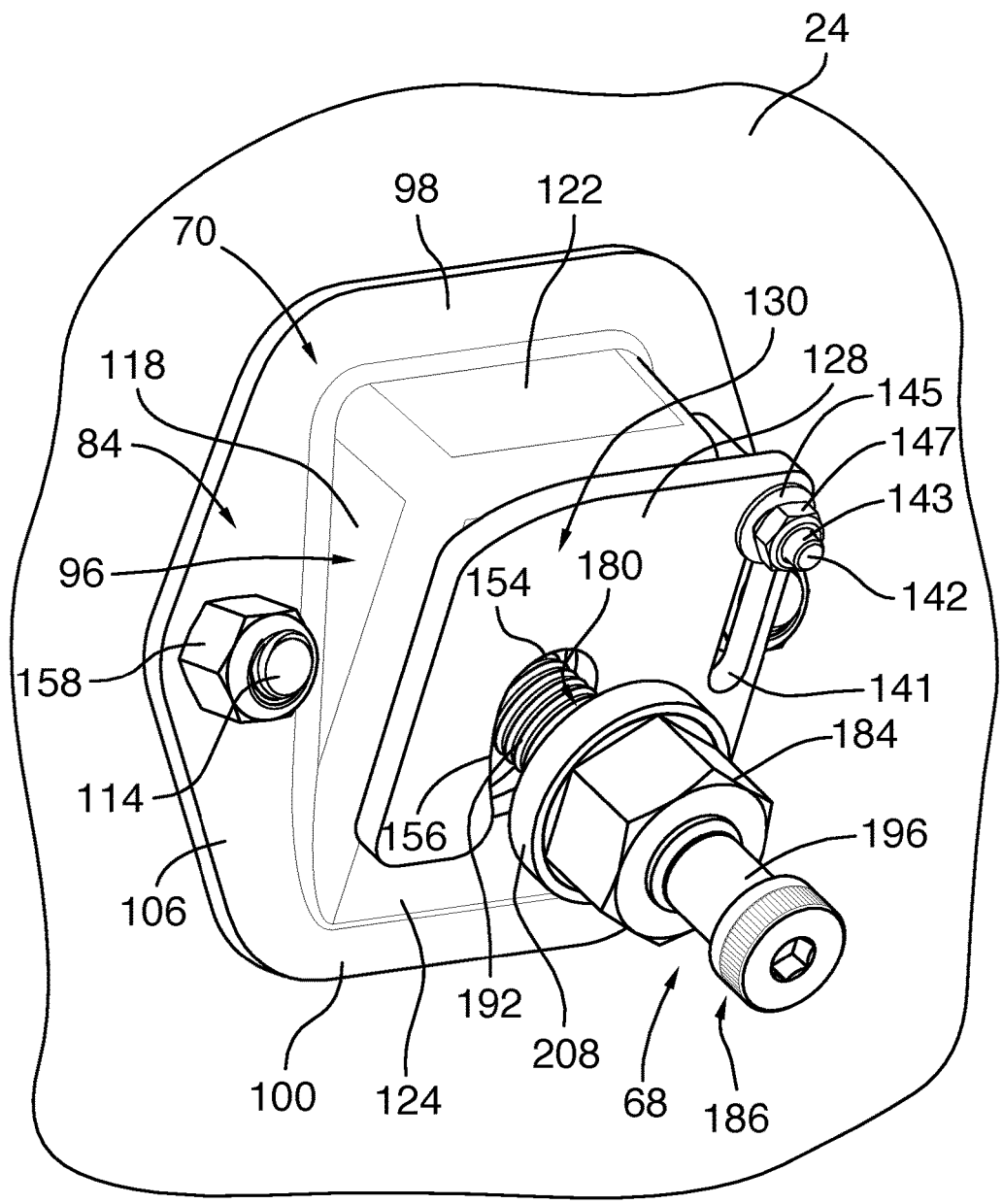
FIG. 10B is a magnified perspective view of one of the plurality of angle box assemblies similar to that shown in FIG. 10A, except that the movable plate is now shown occupying the bolt-securing position.

Having described all the components of the tensioning system 20, a description of an exemplary deployment of the tensioning system 20 to retain the screen media 22 between the side plates 24 and 26 now follows with reference to FIGS. 9, 10A, 10B, 10C and 11. As a preliminary step, the screen media panel 28 is laid onto of the deck frame (not shown) of the vibrating-type screening machine (not shown) with its tensioning hooks 42 and 44 supported on the horizontal shelf 88 defined by the angle member 80 mounted to the side plates 24 and 26. The swiveling plate 128 on each of the angle boxes 70 associated with the side plates 24 and 26 is moved from its bolt-securing position 130 to its bolt-releasing positions 132 so as to provide full access to the central aperture 126 (see FIG. 9). Also, the flange nut 184 of each of the bolt assemblies 80 is threaded towards the shoulder bolt 196. In FIGS. 9, 10A and 10B, the flange nut 184 is shown moved right up to the terminal end 206 of the shank portion 192 for purposes of illustration. In practice, it may not be necessary to move the flange nut 184 that far down the shank portion 192, provided that sufficient clearance between the flange nut 184 and the wedge-like structure 96 can be obtained when the bolt assemblies 68 are mated with the angle boxes 70.

The installation begins with positioning the tensioning rail 52 along with its associated tensioning hardware (i.e. the four bolt assemblies 68) so that the bolt assemblies 68 are disposed opposite the apertures 72 in the side plate 24 and the carriage bolts 180 are oriented downwardly in the direction of line T (shown in FIG. 6). Thereafter, the bolt assemblies 68 are inserted through the aperture 72 in the side plate 24 so as to extend through the space S (shown in FIG. 6) defined by the wedge-like structure 96 and project out of the central apertures 126 formed in the angle boxes 70. As shown in FIG. 10A, in this position, for each bolt assembly 68, the portion of the shank portion 192 carrying the flange nut 184 and the shoulder bolt 196 protrudes beyond the lower wall 124 of the wedge-like structure 96, thereby providing clearance between the wedge-like structure 96 and the flange nut 184.

It should be mentioned that as bolt assemblies 68 are fitted through apertures 72 and 124, the tensioning rail 52 is brought closer to the inner surface 58 of the side plate 24. The first lower bent portion 162 is received in the gap formed between the arms 46 and 48 of the tensioning hook 42.

Referring now to FIG. 10B, with the bolt assemblies 68 well positioned within the angle boxes 70, the swiveling plate 128 of each angle box 70 is now moved from its bolt-releasing position 132 to its bolt-securing position 130. More specifically, the swiveling plate 128 is slid downwardly guided by the engagement of the walls of the oblong slot 141 with the pivot pin 142, while being rotated counter-clockwise about the pivot pin 142. As this occurs, the cutout 150 is brought near the carriage bolt 180. The edges 152 and 156 of the cutout 150 come into contact with the shank portion 192 of the carriage bolt 180 and guide the movement of the swiveling plate 128 to the bolt-securing position 130. When in this position, the semi-circular edge 154 serves as a stop for the shank portion 192.

The foregoing steps are then repeated to deploy the second tensioning assembly 92 associated with the side plate 26.

Figure 10C:
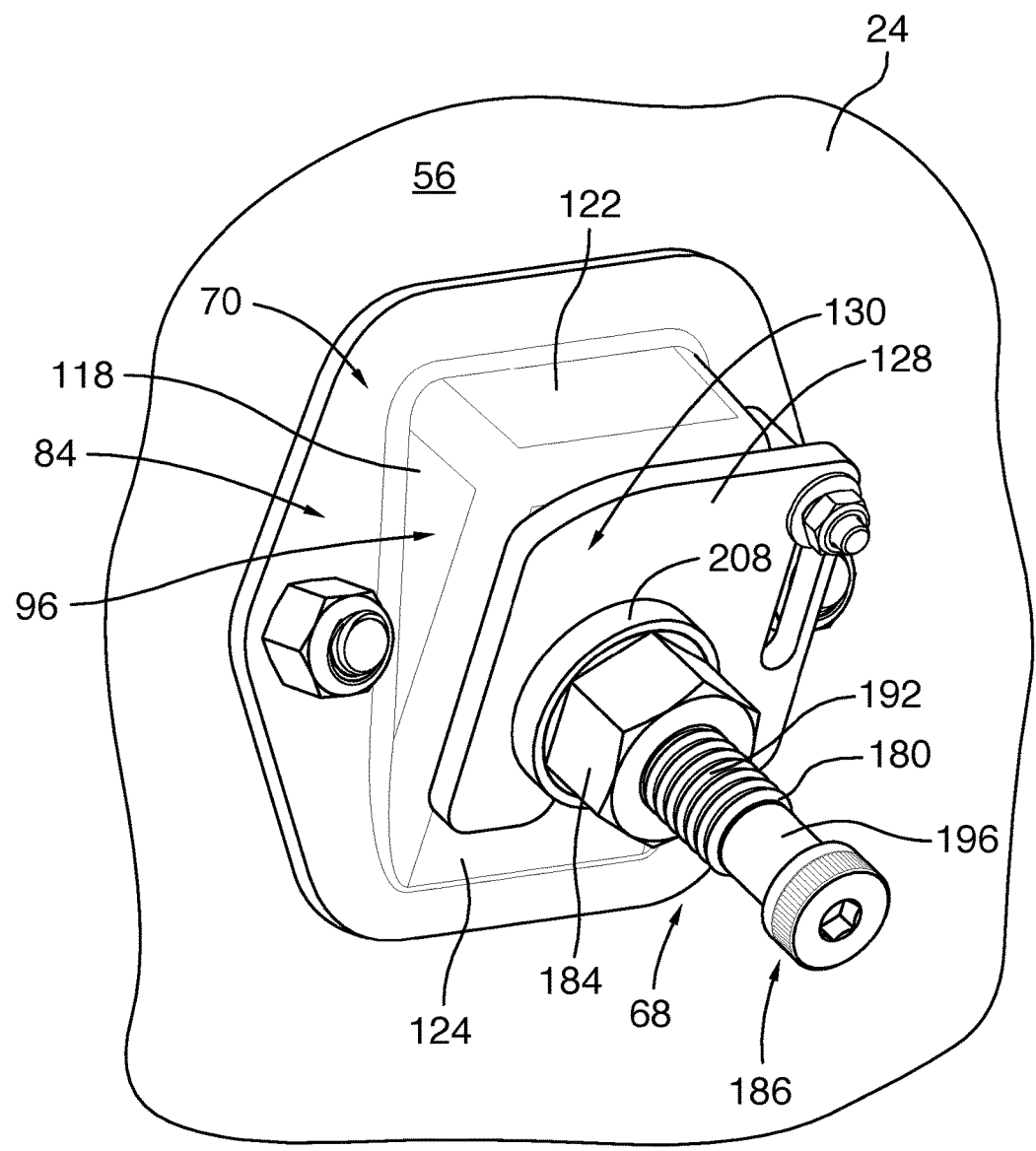
FIG. 10C is a magnified perspective view of one of the plurality of angle box assemblies similar to that shown in FIG. 10B, except that the flange nut on the bolt is now tightened so that it tightly presses against the movable plate.

As a final step, the flange nut 184 in each bolt assembly 68 of the first and second tensioning assemblies 90 and 92 is threaded towards its associated angle box 70 so that the flange portion 208 of the flange nut 184 comes to bear against swiveling plate 128 (see FIG. 10C). The flange nut 184 is further tightened until sufficient tension in the carriage bolt 180 is created. As this occurs, the tensioning rail 52 forcefully engages the side plate 24 and the tensioning hooks 42, and similarly, the tensioning rail 54 forcefully engages the side plate 26 and the tensioning hooks 44 (see FIG. 11). More specifically, in each case, the terminal end 172 of the fourth upper bent portion 168 abuts the inner surface 58 of the side plate 24 or 26 (as the case may be). Also, in each case, the terminal end 170 of the first lower bent portion 162 bears against the intermediate portion 50 pulling the tensioning hook 42 or 44 (as the case may be) towards the side plate 24 or 26. The tension created by the tensioning assemblies 90 and 92 holds the screen media 22 tightly between the side plates 24 and 26.

In the embodiment shown in FIGS. 1 to 11 the tensioning assemblies 90 and 92 employ angle boxes 70 which are provided with swiveling plates 128 that serve to lock the carriage bolts 180. The movement of the swiveling plates 128 combines sliding motion and rotation. However, this need not be the case in every application. In other embodiments, the swiveling plates could be replaced with different movable plates whose movement is limited to translation only (i.e. sliding without any rotation or angular displacement). An example of such an embodiment is illustrated in FIGS. 12 to 19 which show screen media being held between two opposed side plates using a tensioning system generally designated with reference numeral 220. This embodiment uses many of the same components as the earlier described embodiment. To avoid unduly repeating descriptions of identical components, where a component in this alternative embodiment is designated using the same reference numeral as was used for the description of such component in the previous embodiment, it will be understood that the component in the alternative embodiment is the same as the corresponding component in the previous embodiment in all material respects, such that the previous description of that component can be relied upon for the purposes of explaining the alternative embodiment with any variations therefrom being set forth below. With this in mind, it will be understood that tensioning system 220 ties screen media 22 to the side plates 22 and 24.

The side tensioning system 220 can be seen to have a first tensioning assembly 222 associated with side plate 24 and a second tensioning assembly 224 associated with side plate 26. The first tensioning assembly 222 includes a tensioning rail 52, a plurality of bolt assemblies 68 and a corresponding plurality of angle boxes 226 (visible in FIG. 12). Similarly, the second tensioning assembly 224 includes a tensioning rail 54, a plurality of bolt assemblies 68 and a corresponding plurality of angle boxes 226 (visible in FIG. 14). In the embodiment shown in FIG. 12, each tensioning assembly 222, 224 has four bolt assemblies 68 and four angle boxes 226. In other embodiments, the tensioning assemblies could be provided with a greater or lesser number of bolt assemblies and angle boxes.

With reference to FIGS. 15A, 15B, 15C and 16, the angle box 226 is now described in greater detail. The angle box 226 resembles the angle box 70 in that it possesses the roughly hexagonal, flanged, base portion 94 and the hollow, wedge like structure 96 which projects from the base portion 94. The difference between the angle box 226 and the angle box 70 lies in the fact that angle box 226 uses a different movable plate than the swiveling plate 128 employed by angle box 70. In this embodiment the movable plate is in the nature of a sliding plate 228 which may be moved between a bolt-securing position 230 and a bolt-releasing position 232.

Figure 19:
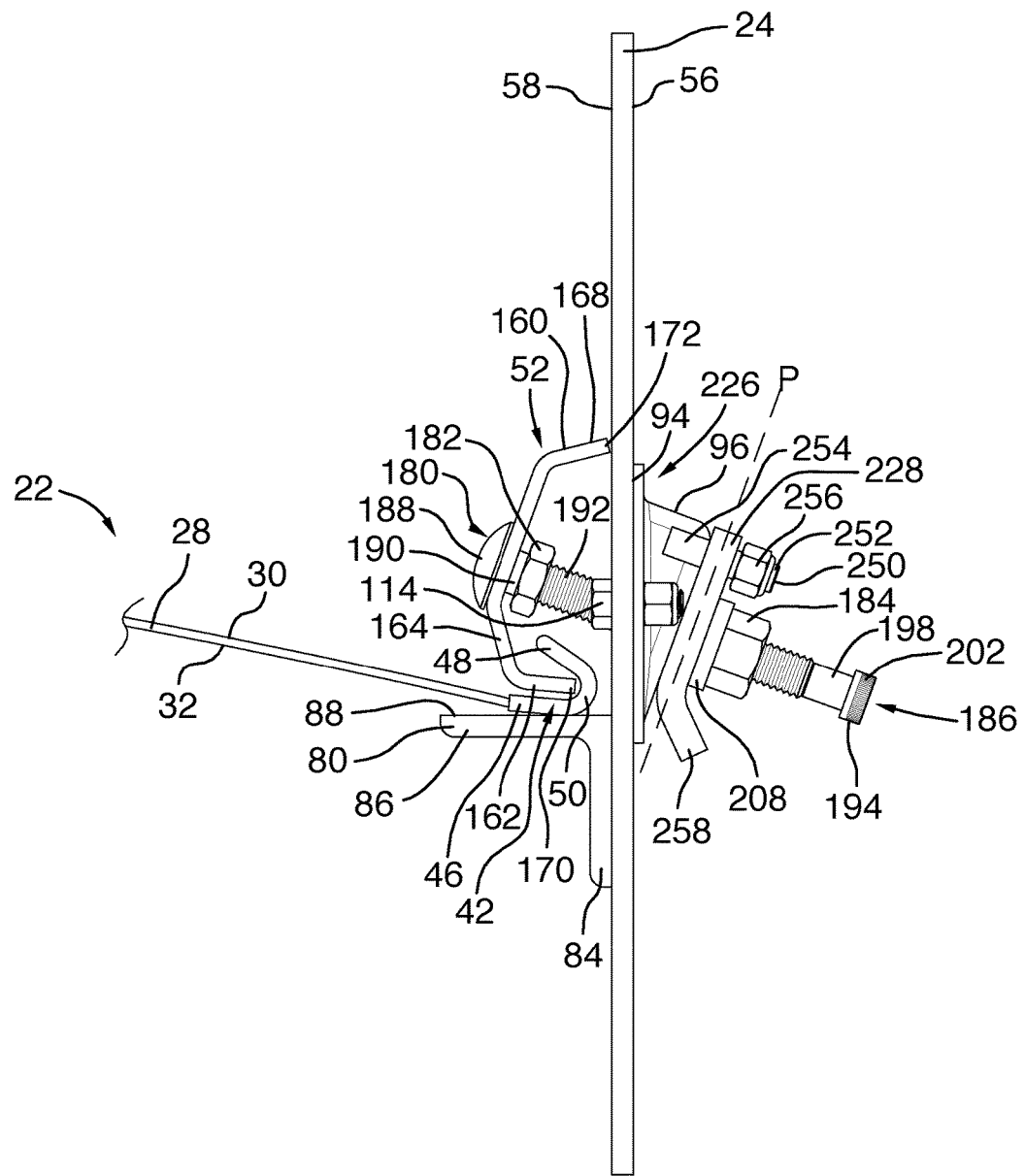
FIG. 19 is a magnified side elevation view of the encircled portion "19" indicated in FIG. 13; showing the first tensioning assembly tying the screen media to one of the side plates of the screening machine.

The sliding plate 228 has a vaguely rectangular footprint when viewed in plan, which is defined by an upper margin 234, a lower margin 236 and opposed lateral margins 238 and 240 which run between the upper and lower margins 234 and 236, joining one to the other. At a location adjacent the lateral margin 238 proximate to where the lateral margin 238 meets the upper margin 234, a first narrow oblong slot 242 is cut into the sliding plate 228. The first oblong slot 242 runs down almost the entire length of the lateral margin 238, terminating at a location adjacent where the lateral margin 238 meets the lower margin 236. The sliding plate 228 also has a second oblong slot 244 that is disposed opposite the first oblong slot 242 and formed adjacent the lateral margin 240. The second oblong slot 244 also runs from a location adjacent where the lateral margin 240 meets the upper margin 234 to a location adjacent where the lateral margin 240 meets joins the lower margin 236. Along most of their respective lengths, the first and second oblong slots 242 and 244 extend along plane P of the sliding plate 228 (shown in FIG. 19). However, the paths of the oblong slots 242 and 244 deviate from the plane P where the sliding plate 228 is formed with an upwardly bent or angled portion 246. As best shown in FIG. 19, the angled portion 246 commences roughly three-quarters of the way down the lateral margins 238 and 240 and terminates at the lower margin 236. Configured in this manner the lower margin 236 is carried away from the plane P at an angle of 45 degrees.

The first and second oblong slots 242 and 244 define parallel tracks for guiding the translational movement of the sliding plate 228 relative to first and second pins 248 and 250 retained therein, respectively. Each pin 248, 250 has a threaded top portion 252 and an unthreaded bottom portion 254 which is of larger diameter than the top portion 252. The bottom portion 254 of the pin 248 is welded to the wedge-like structure 96 at a site along the lateral triangular portion 118. Similarly, the bottom portion 254 of the pin 250 is welded to the lateral triangular portion 120 of the wedge-like structure 96. The top portion 252 of each pin 248, 250 is captively retained within the slot 242, 244, respectively by a nut 256. As explained in greater detail below, it is the oblong slots 242 and 244 and the pins 248 and 250 which allow the sliding plate 228 to travel between a bolt-securing position 230 and a bolt-releasing position 232.

In the center of the angled portion 246, a large section of plate material is removed to thereby define two spaced apart tabs 258 and 260 which accommodate the bottom ends of oblong slots 242 and 244. The space G defined between the tabs 258 and 260 opens onto an elongated cutout 262 which cuts deeply into the sliding plate 228 at a location adjacent the roughly midway between the lateral margins 238 and 240, and extends upwardly about halfway into the main planar portion 264 of sliding plate 228. The shape of the cutout 262 can be seen to be defined substantially by edge portions 266, 268 and 270. Straight edge portion 266 and 270 are generally parallel to each other and are joined to each other by the semi-circular edge portion 268. The width of the cutout 262 as measured between the edge portions 266 and 270 is larger than the diameter of the threaded portion of a carriage bolt 180 of the bolt assembly 68, but it is sized smaller than a flange nut 184 of the bolt assembly 68.

Figure 15A:
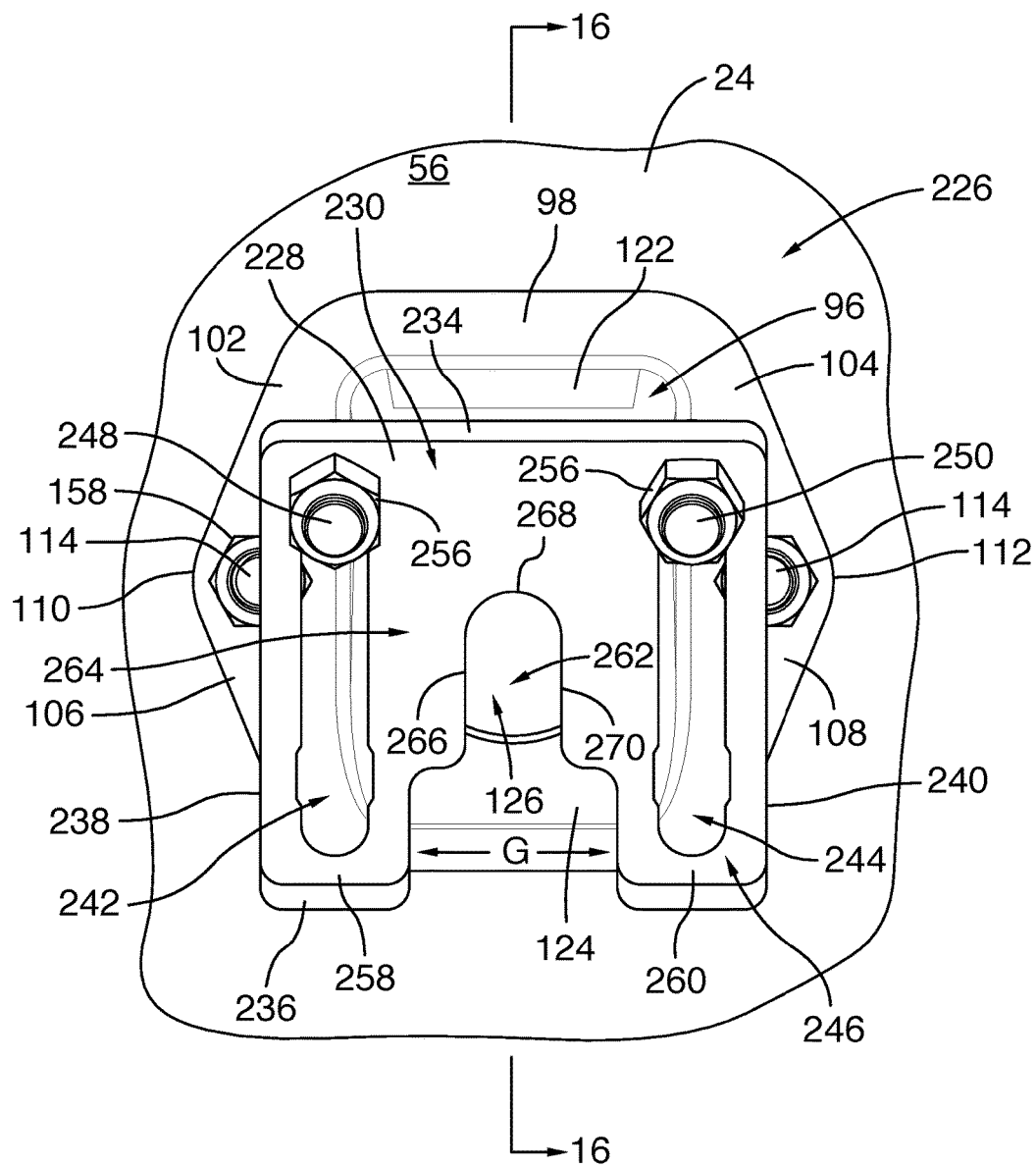
FIG. 15A is a magnified end view of an angle box of the first tensioning assembly illustrated in FIG. 12 shown mounted to a portion of the side plate with a movable plate of the angle box occupying a bolt-securing position.

Referring to FIG. 15A, when the sliding plate 228 is in the bolt-securing position 230, the pins 248 and 250 are at the top ends of the oblong slots 242 and 244, respectively, the sliding plate 228 is superimposed over the lower wall 124 of the wedge-shaped structure 96 such that it substantially overlaps with it and significantly occludes the central aperture 126 formed in the lower wall 124. As a result, the opening defined by the central aperture 126 is severely constricted, and is now reduced to the size of the cutout 262.

Figure 15B:
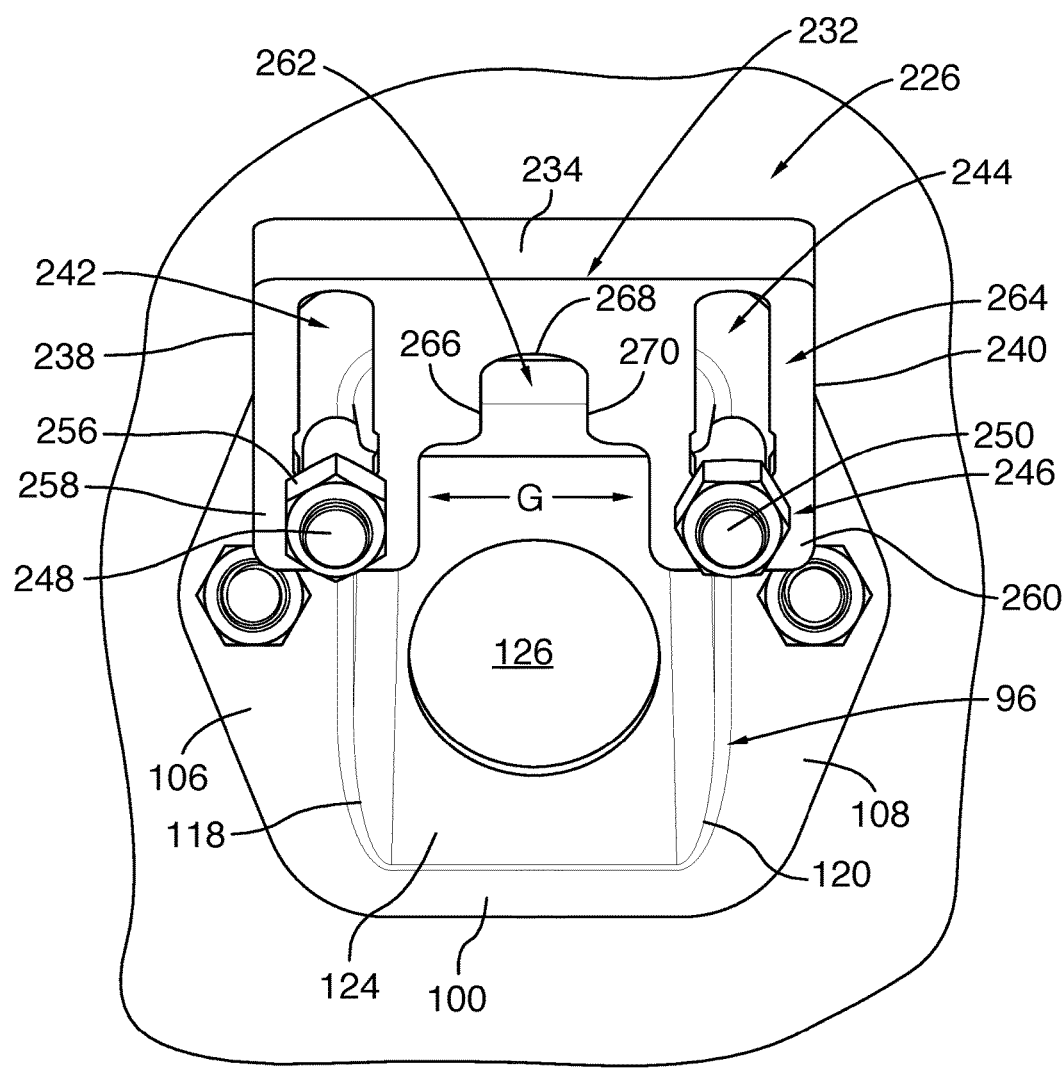
FIG. 15B is another magnified end view of the angle box and the side plate similar to that illustrated in FIG. 15A, except that the movable plate is now shown occupying a bolt-releasing position.
Figure 16:
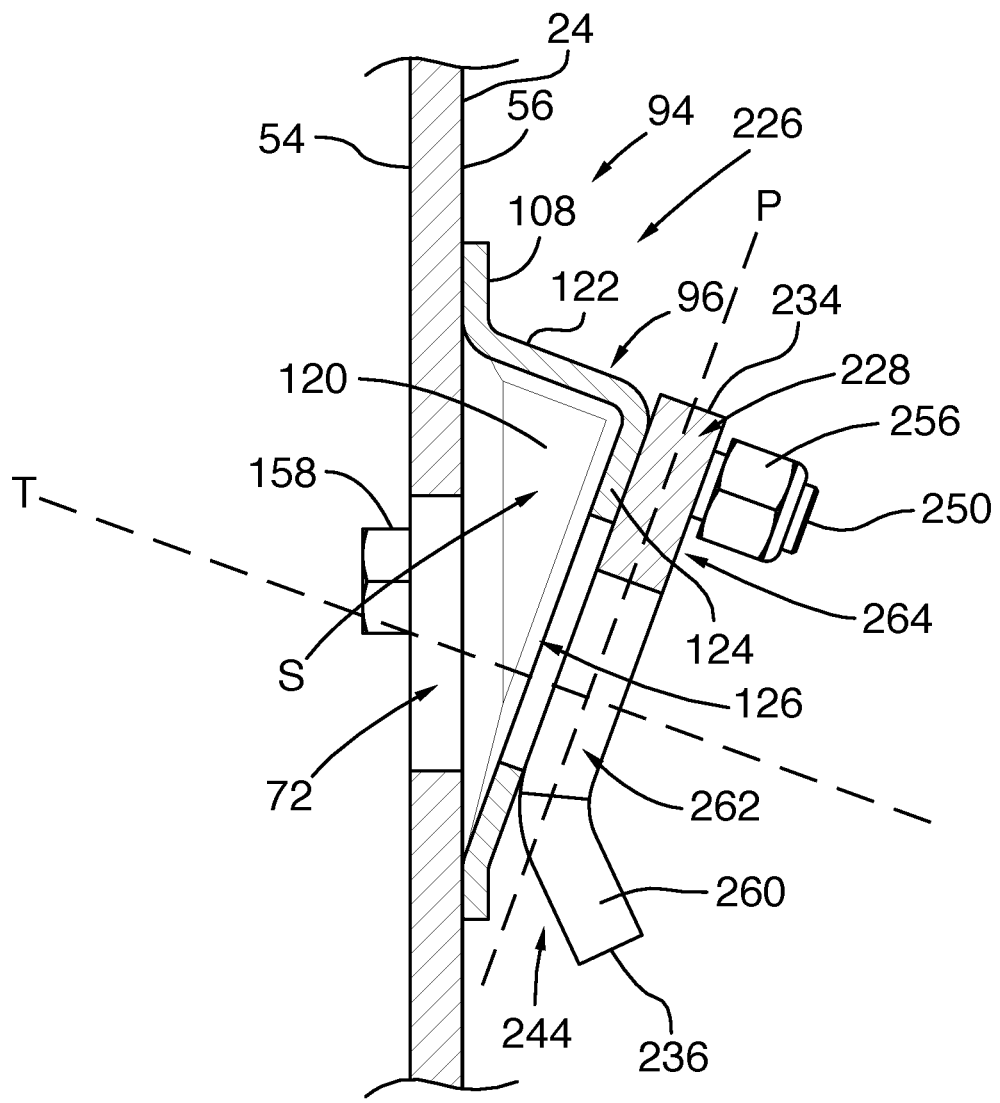
FIG. 16 is a cross-sectional view of the angle box and side plate shown in FIG. 15A taken along line "16-16"
Figure 17:
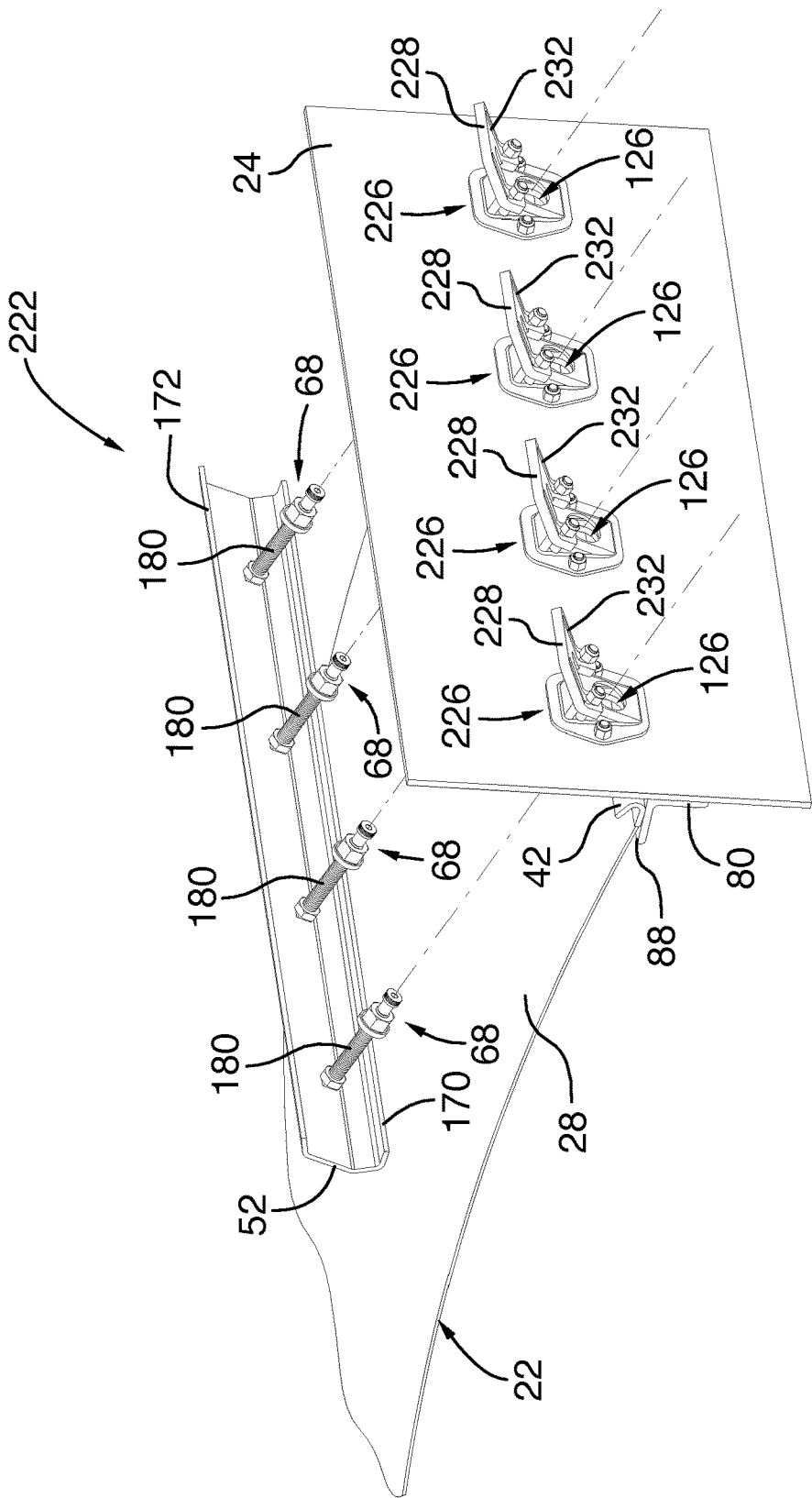
FIG. 17 is a partially exploded, top left perspective view showing the screen media and a plurality of angle boxes of the first tensioning assembly carried on the side plate shown in FIG. 1 with the tensioning rail and a plurality of bolt assemblies exploded therefrom.

Referring to FIG. 15B, to move the sliding plate 228 to the bolt-releasing position 232, the sliding plate 228 is urged to slide upwards until the bottom ends of the oblong slots 242 and 244 abut the pins 248 and 250, respectively. At that point the sliding plate 228 no longer occludes the central aperture 126 formed in the lower wall 124, leaving the opening defined by the central aperture 126 fully exposed. It will be appreciated that as the sliding plate 228 moves relative to the pins 248 and 250, the main planar portion 264 will move generally parallel to the lower wall 124 of the wedge-like structure 96 until the angled portion 246 of the sliding plate 228 reaches the pins 248 and 250. At that stage, the main planar portion 264 will adopt an angled orientation relative to the lower wall 124. When the bottom ends of the oblong slots 242 and 244 make contact with the pins 248 and 250, the main planar portion 264 hangs well over the pins thereby discouraging the sliding plate 228 from accidentally sliding back towards the bolt-securing position 230 by virtue of the force of gravity alone.

During assembly of the side tensioning system 20, the angle box 226 is fastened to the side plate 24 in the same manner as angle box 70, such that no further description is required. When the angle box 226 is mounted to the side plate 24, the aperture 126 in the angle box 226 aligns with one of the apertures 72 in the side plate 24 or 26 along a line T (shown in FIG. 19) which represents the direction of the tensioning force applied by the side tensioning system 220.

A description of an exemplary deployment of the side tensioning system 220 to retain the screen media 22 between the side plates 24 and 26 now follows with reference to FIGS. 17, 18A, 18B, 18C and 19. As a preliminary step, the screen media panel 28 is laid onto of the deck frame (not shown) of the vibrating-type screening machine (not shown) with its tensioning hooks 42 and 44 supported on the horizontal shelf 88 defined by the angle member 80 mounted to the side plates 24 and 26. The sliding plate 228 on each of the angle boxes 226 associated with the side plates 24 and 26 is moved from its bolt-securing position 230 to its bolt-releasing positions 232 so as to provide full access to the central aperture 126 (see FIG. 17). Also, the flange nut 184 of each of the bolt assemblies 80 is threaded towards the shoulder bolt 196.

Figure 18A:
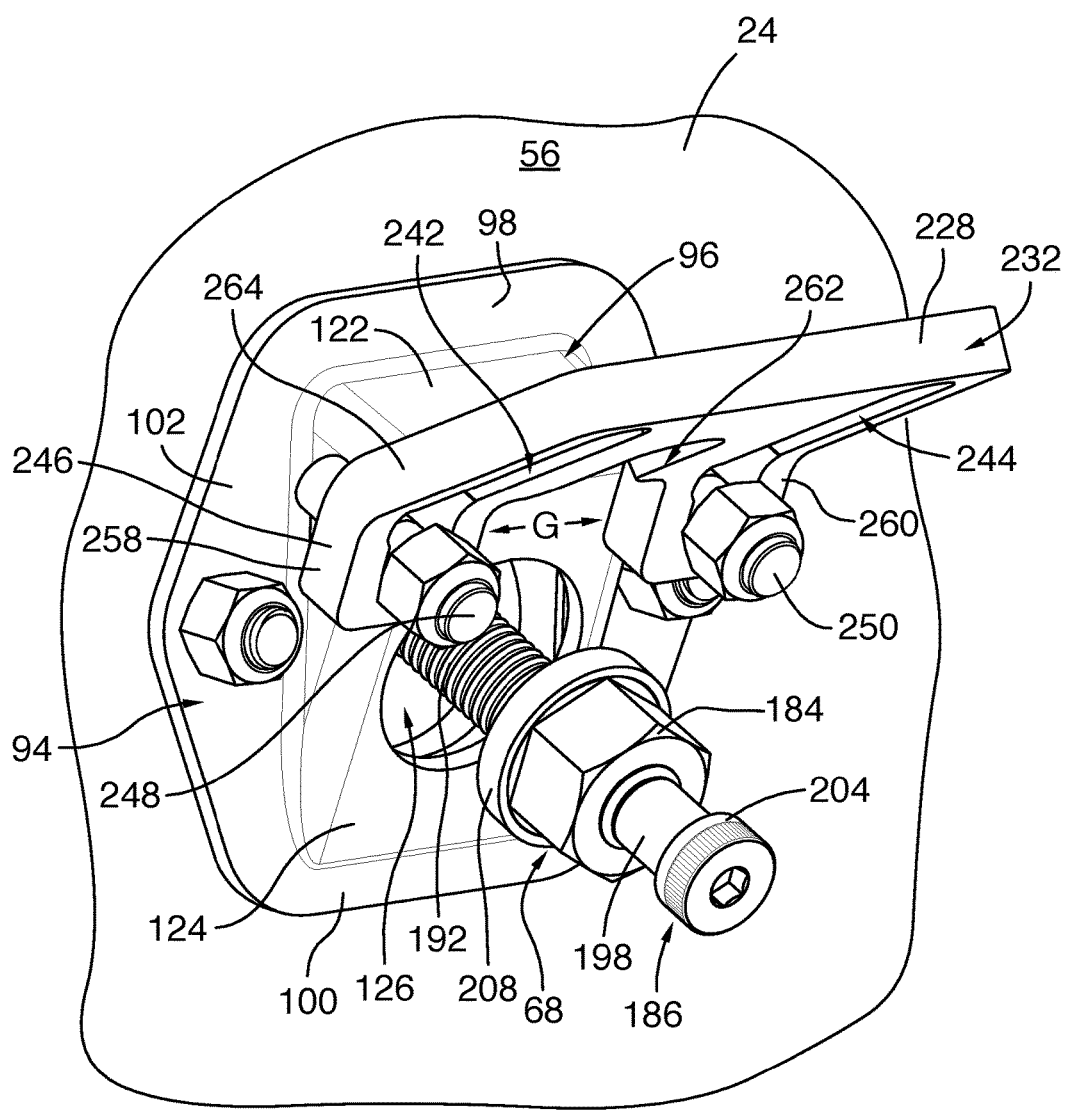
FIG. 18A is a magnified perspective view of one of the plurality of angle box assemblies illustrated in FIG. 17 showing the angle box receiving a bolt therethrough, the flange nut on the bolt being loosened so as to provide clearance between the flange nut and the movable plate, and the movable plate occupying the bolt-releasing position.

The installation begins with positioning the tensioning rail 52 along with its associated tensioning hardware (i.e. the four bolt assemblies 68) so that the bolt assemblies 68 are disposed opposite the apertures 72 in the side plate 24 and the carriage bolts 180 are oriented downwardly in the direction of line T (shown in FIG. 19). Thereafter, the bolt assemblies 68 are inserted through the aperture 72 in the side plate 24 so as to extend through the space S (shown in FIG. 6) defined by the wedge-like structure 96 and project out of the central apertures 126 formed in the angle boxes 226. As shown in FIG. 18A, in this position, for each bolt assembly 68, the portion of the shank portion 192 carrying the flange nut 184 and the shoulder bolt 196 protrudes beyond the lower wall 124 of the wedge-like structure 96, thereby providing clearance between the wedge-like structure 96 and the flange nut 184.

It should be mentioned that as bolt assemblies 68 are fitted through apertures 72 and 124, the tensioning rail 52 is brought closer to the inner surface 58 of the side plate 24. The first lower bent portion 162 is received in the gap formed between the arms 46 and 48 of the tensioning hook 42.

Figure 18B:
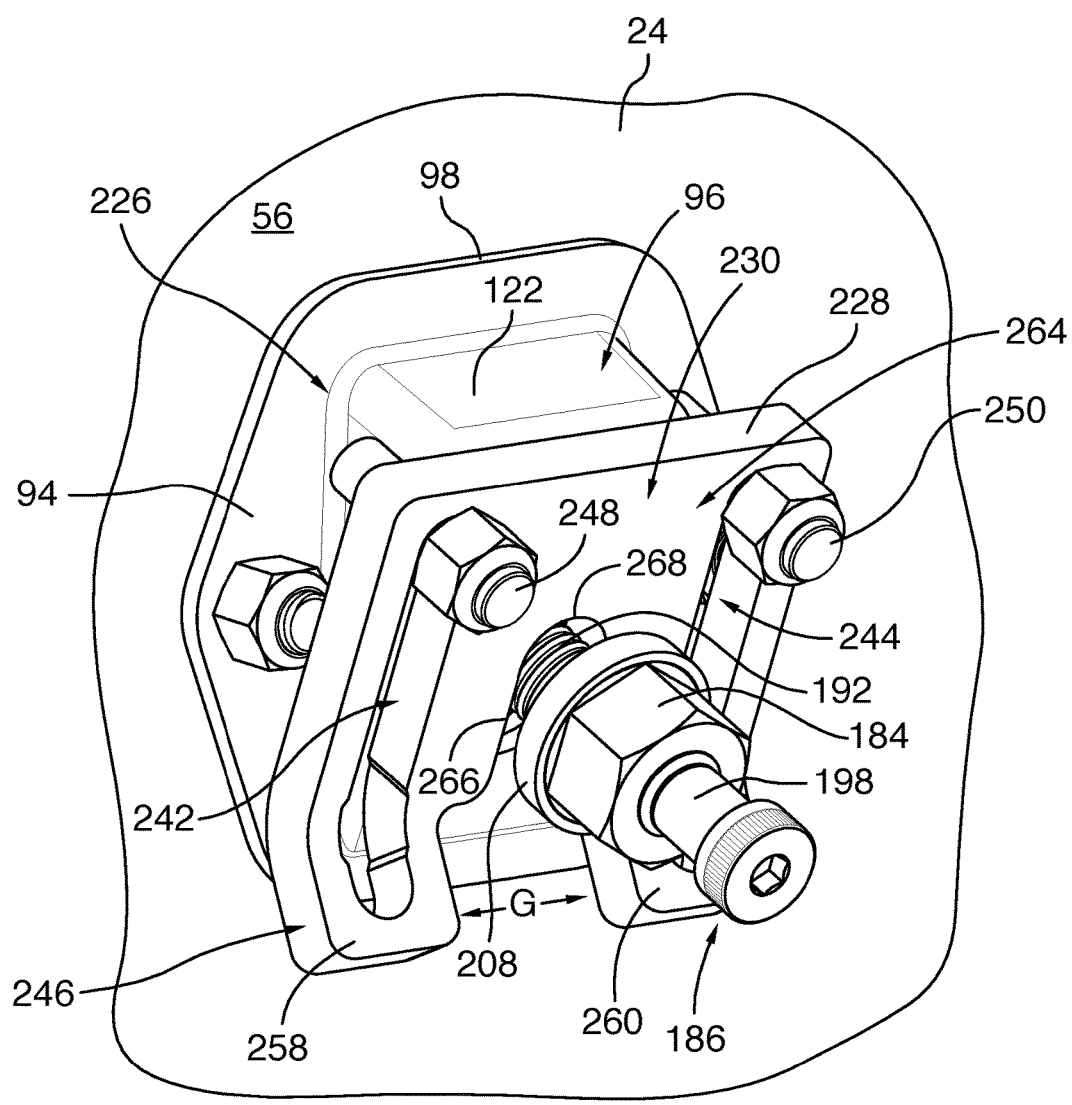
FIG. 18B is a magnified perspective view of one of the plurality of angle box assemblies similar to that shown in FIG. 18A, except that the movable plate is now shown occupying the bolt-securing position.

Referring now to FIG. 18B, with the bolt assemblies 68 well positioned within the angle boxes 226, the sliding plate 228 of each angle box 226 is now moved from its bolt-releasing position 232 to its bolt-securing position 230. More specifically, the sliding plate 228 is slid downwardly guided by the engagement of the walls of the oblong slots 242 and 244 with the pin 248 and 250. As this occurs, the cutout 262 is brought near the carriage bolt 180. The edges 266 and 270 of the cutout 262 come into contact with the shank portion 192 of the carriage bolt 180 and guide the movement of the sliding plate 228 to the bolt-securing position 230. When in this position, the semi-circular edge 268 serves as a stop for the shank portion 192.

The foregoing steps are then repeated to deploy the second tensioning assembly 224 associated with the side plate 26.

Figure 18C:
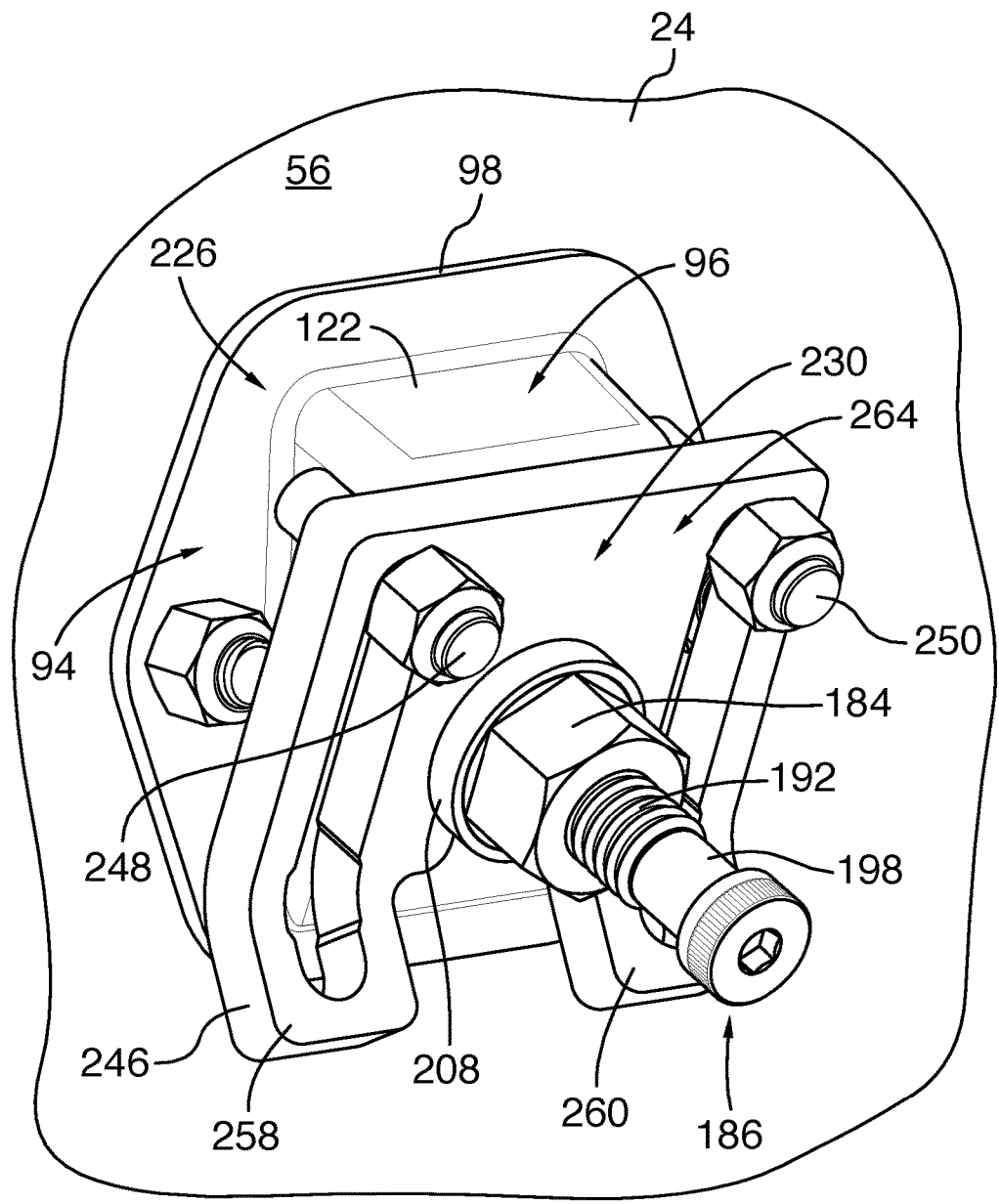
FIG. 18C is a magnified perspective view of one of the plurality of angle box assemblies similar to that shown in FIG. 18B, except that the flange nut on the bolt is now tightened so that it tightly presses against the movable plate.

As a final step, the flange nut 184 in each bolt assembly 68 of the first and second tensioning assemblies 222 and 224 is threaded towards its associated angle box 226 so that the flange portion 208 of the flange nut 184 comes to bear against moving plate 228 (see FIG. 18C). The flange nut 184 is further tightened until sufficient tension in the carriage bolt 180 is created. As this occurs, the tensioning rail 52 forcefully engages the side plate 24 and the tensioning hooks 42, and similarly, the tensioning rail 54 forcefully engages the side plate 26 and the tensioning hooks 44 (see FIG. 19). More specifically, in each case, the terminal end 172 of the fourth upper bent portion 168 abuts the inner surface 58 of the side plate 24 or 26 (as the case may be). Also, in each case, the terminal end 170 of the first lower bent portion 162 bears against the intermediate portion 50 pulling the tensioning hook 42 or 44 (as the case may be) towards the side plate 24 or 26. The tension created by the tensioning assemblies 222 and 224 holds the screen media 22 tightly between the side plates 24 and 26 and on the deck frame (not shown).

Figure 20A:
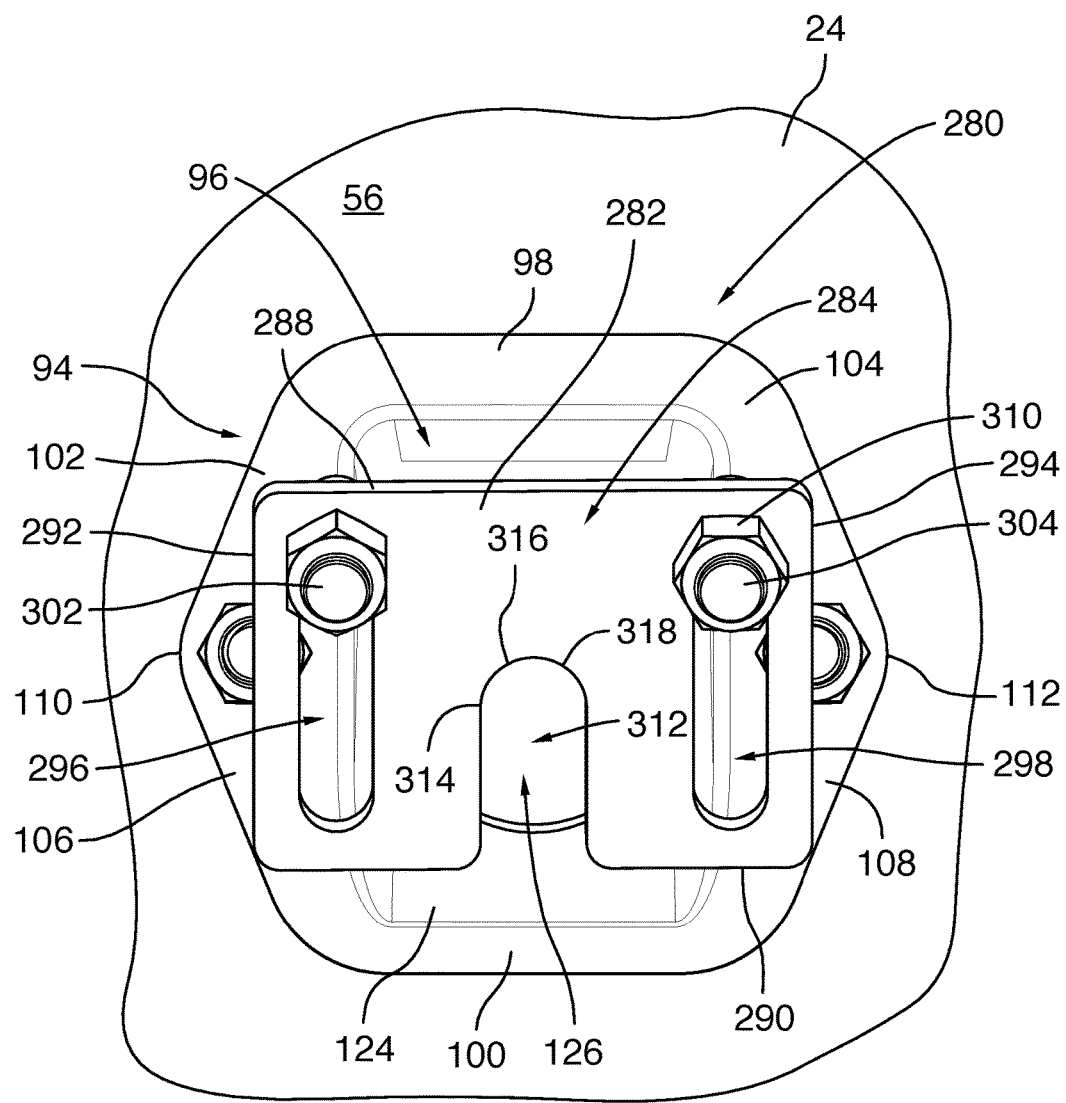
FIG. 20A is a magnified end view of an angle box mounted to a side plate, the angle box being provided with an alternate movable plate to that illustrated in FIG. 15A, the movable plate being shown in a bolt-securing position.
Figure 20B:
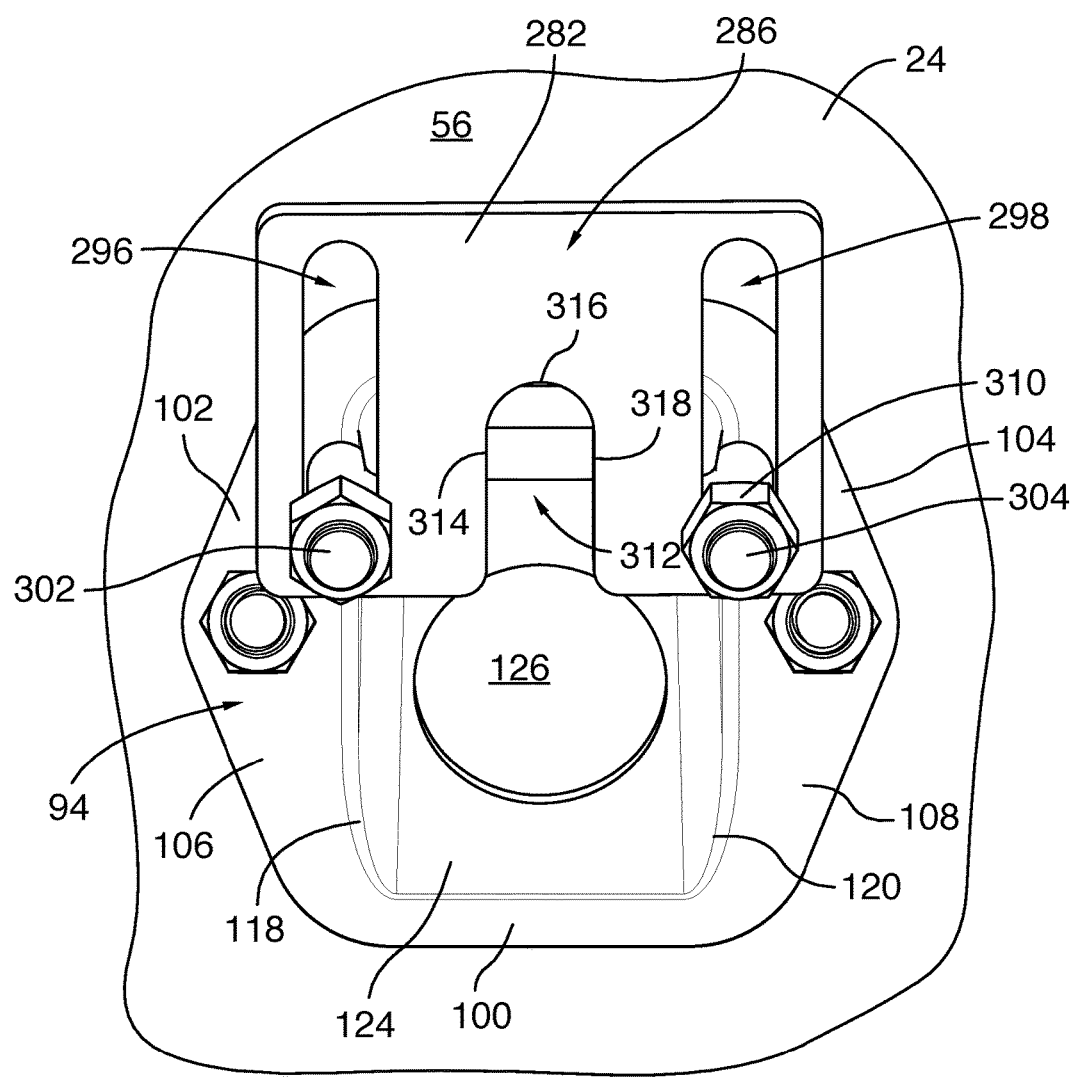
FIG. 20B is another magnified end view of the angle box and the side plate similar to that illustrated in FIG. 20A, except that the movable plate is now shown occupying a bolt-releasing position.

In the embodiment shown in FIGS. 12 to 19, the slidable plate 228 includes a main planar portion 264 and an upwardly bent or angled portion 246. As mentioned above, the configuration of the sliding plate 228 with an angled portion is advantageous in that, when the sliding plate is in the bolt-releasing position 232, it tends to discourage the sliding plate 228 from sliding back toward the bolt-securing position 230. While this feature may be useful in certain applications, it need not be included in every embodiment where a sliding plate is used. In certain embodiments this feature could be omitted. An example of such an embodiment is shown in FIGS. 20A and 20B wherein an alternate angle box to angle box 226 is designated generally with reference numeral 280.

The angle box 280 uses many of the same components as angle box 226 and angle box 70. To avoid unduly repeating descriptions of identical components, where a component in this alternative embodiment is designated using the same reference numeral as was used for the description of such component in the preferred embodiment, it will be understood that the component in the alternative embodiment is the same as the corresponding component in the preferred embodiment in all material respects, such that the previous description of that component can be relied upon for the purposes of explaining the alternative embodiment with any variations therefrom being set forth below.

The angle box 280 resembles the angle boxes 70 and 226 in that it possesses the roughly hexagonal, flanged, base portion 94 and the hollow, wedge like structure 96 which projects from the base portion 94. In like fashion to angle box 226, the angle box 280 also employs a movable plate in the nature of sliding plate 282 which is restricted to translational movement only. The sliding plate 282 can be moved between a bolt-securing position 284 and a bolt-releasing position 286.

Figure 20C:
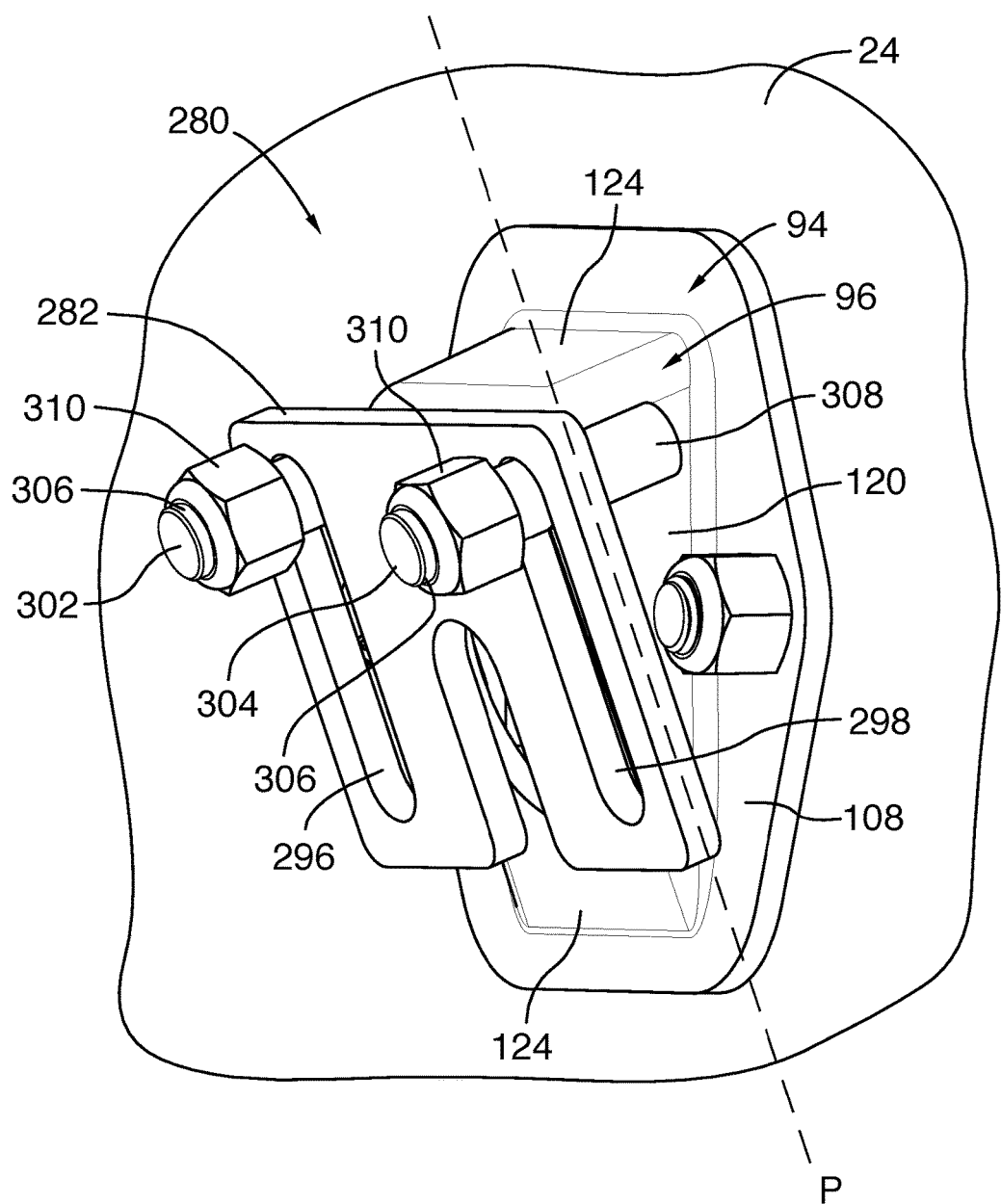
FIG. 20C is a side elevation view of the angle box and side plate illustrated in FIG. 20A.

The sliding plate 282 has a generally rectangular footprint when viewed in plan, which is defined by an upper margin 288, a lower margin 290 and opposed lateral margins 292 and 294 which run between the upper and lower margins 288 and 290, joining one to the other. At a location adjacent the lateral margin 292 proximate to where the lateral margin 292 meets the upper margin 288, a first narrow oblong slot 296 is cut into the sliding plate 282. The first oblong slot 296 runs down almost the entire length of the lateral margin 292, terminating at a location adjacent where the lateral margin 292 meets the lower margin 290. The sliding plate 282 also has a second oblong slot 298 that is disposed opposite the first oblong slot 296 and formed adjacent the lateral margin 294. The second oblong slot 298 also runs from a location adjacent where the lateral margin 294 meets the upper margin 288 to a location adjacent where the lateral margin 294 meets joins the lower margin 290. In contrast to the first and second oblong slots 242 and 244 of slidable plate 228, the oblong slots 296 and 298 do not deviate from the plane P of the sliding plate 228 (see FIG. 20C). The slidable plate is not formed with a bent or angled portion such that it extends along plane P along its entire extent.

The first and second oblong slots 296 and 298 define parallel tracks for guiding the translational movement of the sliding plate 282 relative to first and second pins 300 and 302 retained therein, respectively. Each pin 302, 304 has a threaded top portion 306 and an unthreaded bottom portion 308 which is of larger diameter than the top portion 306 (best shown in FIG. 20C). The bottom portion 308 of the pin 300 is welded to the wedge-like structure 96 at a site along the lateral triangular portion 118. Similarly, the bottom portion 308 of the pin 300 is welded to the lateral triangular portion 120 of the wedge-like structure 96. The top portion 306 of each pin 300, 302 is captively retained within the slot 296, 298, respectively by a nut 310. The oblong slots 296 and 298 and the pins 300 and 302 which the sliding plate 228 to travel between a bolt-securing position 284 and a bolt-releasing position 286.

A rather significant, elongated cutout 312 is formed within the sliding plate 282. The cutout 312 bites deeply into the lower margin 290 at a location roughly midway between the lateral margins 292 and 294, and extends upwardly about halfway into the sliding plate 282. The shape of the cutout 262 can be seen to be defined substantially by edge portions 314, 316 and 318. Straight edge portion 314 and 318 are generally parallel to each other and are joined to each other by the semi-circular edge portion 316. The width of the cutout 312 as measured between the edge portions 314 and 318 is larger than the diameter of the threaded portion of a carriage bolt 180 of the bolt assembly 68, but it is sized smaller than a flange nut 184 of the bolt assembly 68.

Referring specifically to FIG. 20A, when the sliding plate 228 is in the bolt-securing position 284, the pins 302 and 304 are at the top ends of the oblong slots 296 and 298, respectively, the sliding plate 282 is superimposed over the lower wall 124 of the wedge-shaped structure 96 such that it substantially overlaps with it and significantly occludes the central aperture 126 formed in the lower wall 124. As a result, the opening defined by the central aperture 126 is severely constricted, and is now reduced to the size of the cutout 262.

Referring specifically to FIG. 20B, to move the sliding plate 282 to the bolt-releasing position 286, the sliding plate 282 is urged to slide upwards until the bottom ends of the oblong slots 296 and 298 abut the pins 300 and 302, respectively. At that point the sliding plate 282 no longer occludes the central aperture 126 formed in the lower wall 124, leaving the opening defined by the central aperture 126 fully exposed to revert back to its full size.

The deployment of a tensioning assembly which includes angle boxes 280 is carried out substantially as described in the context of the side tensioning system 220 shown in FIGS. 12 to 19, such that no additional description is required.

Other changes could be made to the movable plate of the angle box. For instance, in alternative embodiments, the movable plate could be configured to slide laterally (i.e. side-to side), diagonally, or in any direction, instead of an up and down to alternatively, occlude or give full access to, the central aperture 126 in the wedge-like structure 96. In an embodiment where the movable plate was configured to slide laterally, the slots formed in the movable plate would be oriented horizontally instead of vertically. Alternatively, movement of the movable plate could be restricted to rotational movement only.

In other embodiments, the movable plate could be hingedly connected to angle box (or the wedge-like structure). In such an embodiment, the movable plate could be pivoted about the hinge axis to move the plate from a bolt-securing position (wherein the movable plate is superimposed onto the lower wall 124 of the wedge-like structure 96) to a bolt releasing position (wherein the movable plate is no longer superimposed onto the lower wall 124). Conceivably, the movable plate could be connected to the angle box by other means. For instance, it could be tied or tethered to the angle box with a cable or leash. When in the bolt-releasing position, the plate could be strapped down to the angle box at a location which does not interfere with access to the central aperture formed in the wedge-like structure. When required, the plate could be moved to the bolt-securing position where it partially obstructs the central aperture, engages the carriage bolt 180 and is acted upon by the flange nut 184.

From the foregoing description, it will be appreciated that the tensioning system fabricated in accordance with the principles of the present invention tends to be easy to manufacture. Moreover, the configuration of a larger aperture in the angle box and the provision of a movable plate which can be moved to partially obstruct or fully expose the large aperture, along with the provision of a tension rail and bolt assembly which can be installed or removed altogether without requiring assembly or disassembly (as the case may be) of the fastening hardware, create a tensioning system that tends to be effective, simple and quick to deploy even using a single workman.

All of the embodiments described above make use of an angle box provided with a movable plate. However, the principles of the present invention could be applied differently to similar advantage. For instance, in an alternative embodiment, it may be possible to do away with the movable plate in favour of an angle box that is movable relative to the side plate. This could be implemented in any number of ways. For example, an angle box could be configured with a larger flange portion to accommodate horizontal or vertical slots that receive pins which are attached to the side plate. In such an embodiment, the slots would serve to guide the movement of the angle box relate to the side plate, in a manner not dissimilar to that with which the first and second slots 242 and 244 defined in the movable plate 228 guide the movable plate relative to the stationary angle box 226. In such an embodiment, the central aperture would still be sized larger than the largest width/diameter dimension of the bolt assembly. The aperture could remain circular or it could have some other suitable shape, such as a keyhole-shape. Where the aperture is keyhole-shaped, it could be provided with a narrow opening communicating with a larger opening—such that when the angle box is moved to its bolt-releasing position, the large opening (which would be sized larger than the bolt assembly) would be aligned with the bolt assembly and would allow the bolt assembly to be removed, and when the angle box is moved to its bolt-securing position, the narrow opening (which would be sized smaller than the bolt assembly) would be aligned with the angle box and would prevent the removal of the bolt assembly when the angle box is fastened thereto.

FIGS. 22A, 22B and 23A to 23C illustrate another embodiment of a movable angle box mountable to a side plate. In these drawings, the movable angle box is designated generally with reference numeral 480. For the purposes of describing the movable angle box 480, it will be necessary to describe its engagement with a side plate, a tensioning rail and a bolt assembly. As these latter components are identical to the side plate, tensioning rail and bolt assembly described earlier, they will be designated with the same reference numeral and the previous description of these components can be relied upon for the purposes of explaining this alternative embodiment with any variations therefrom being set forth below. With this in mind, it will be understood that movable angle box 480 forms part of a tensioning assembly that also includes a tensioning rail 52 and a bolt assembly 68. Moreover, the movable angle box 480 is engageable with the side plate 24 and the bolt assembly 68.

Figure 22A:
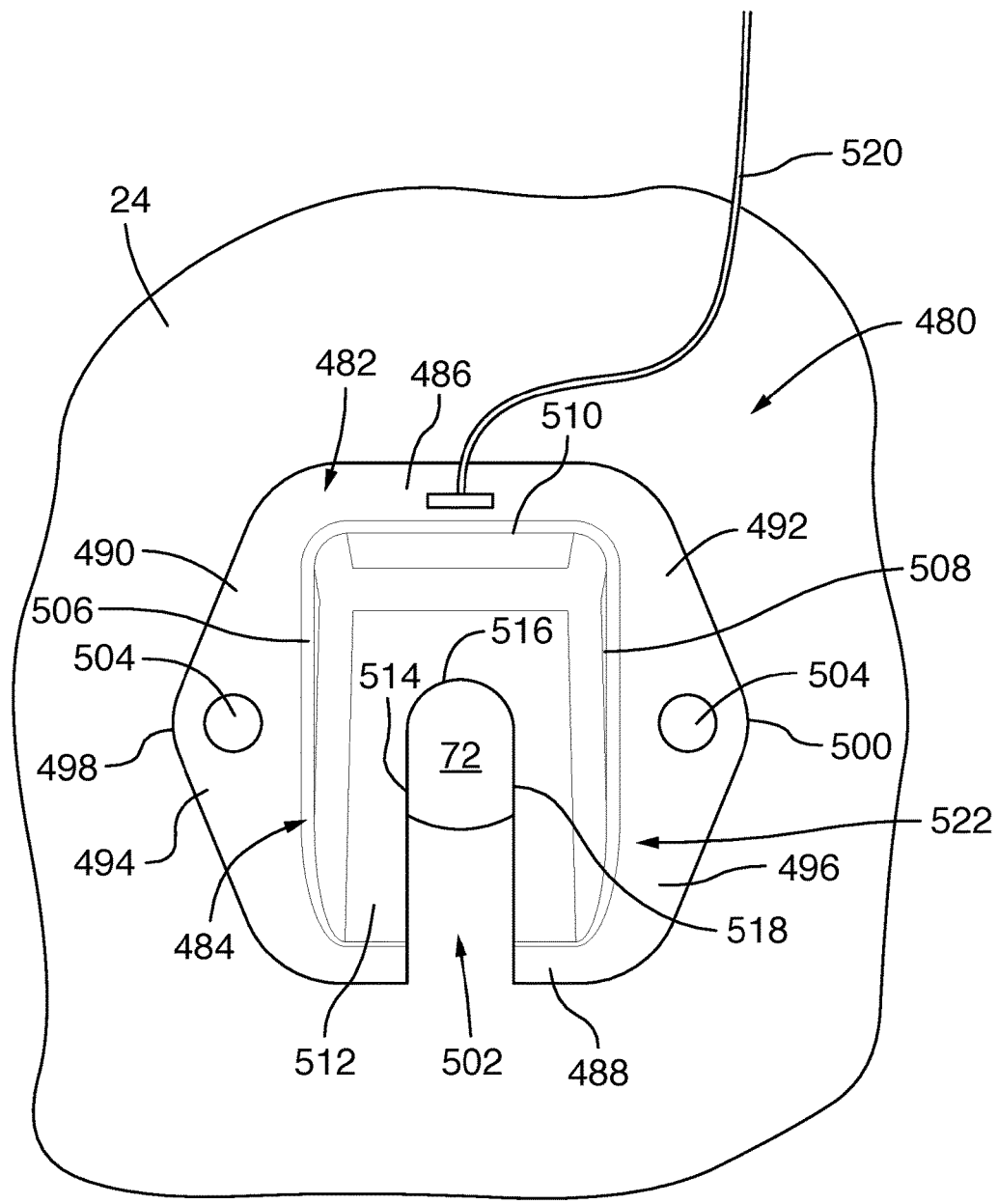
FIG. 22A is a magnified end view of an angle box in accordance with another embodiment of the present invention shown releasably mounted to a portion of a side plate, the angle box occupying its bolt-securing position.
Figure 22B:
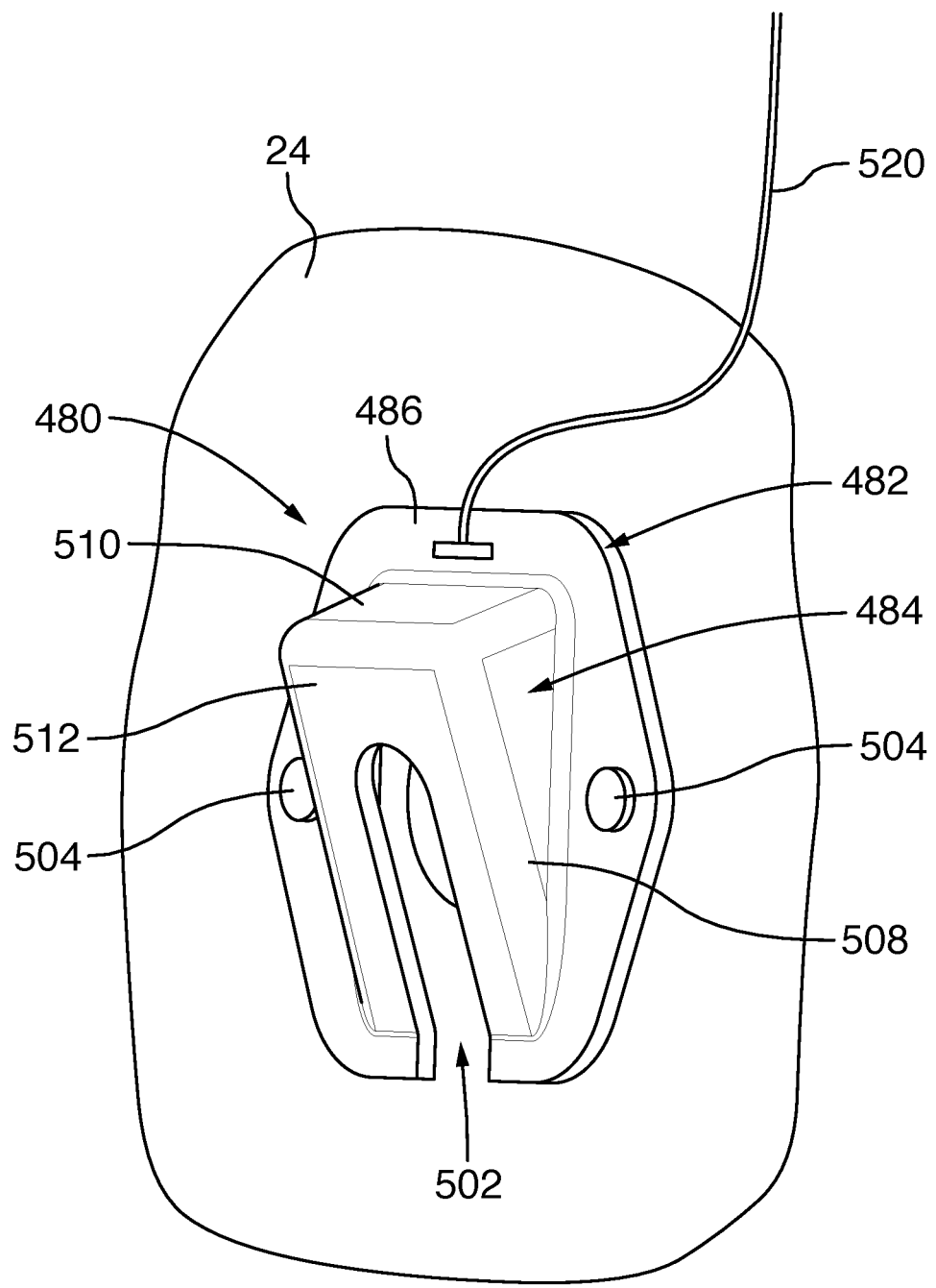
FIG. 22B is a perspective view the angle box and side plate shown in FIG. 22A.

Referring now specifically to FIGS. 22A and 22B, the movable angle box 480 is now described in greater detail. The angle box 480 has a roughly hexagonal, flanged, base portion 482 which can be considered to form the back of the angle box and a hollow, wedge like structure 484 which projects from the base portion 482 and is integrally formed therewith, and can be understood to form the front of the angle box. The angle box 480 is not fully closed, its back is open to allow access to the space (not visible) defined by the wedge-like structure 484.

In this embodiment, the flanged base portion 482 is shown be distinct from the wedge-like structure 484. This need not be the case in every application. In alternative embodiments, the angle box could be formed without a defined flange portion. For example, it may be possible to replace the flange portion with mounting tabs or simply configure the wedge-like structure to attach directly to the side plate.

The base portion 482 is generally similar to the base portion 94 of the angle box 70 in that it too is defined by a top flange portion 486, a bottom flange portion 488, a pair upper lateral angled flange portions 490 and 492, and a pair of lower lateral angled flange portions 494 and 496. The top flange portion 486 extends between the upper lateral flange portions 490 and 492. The flange portions 490 and 492 extend downwardly away from the top flange 486 in a diverging manner. The upper lateral flange portion 490 meets the lower lateral flange portion 494 at a first juncture 498 and similarly, the upper lateral flange portion 492 joins the lower lateral flange portion 496 at a second juncture 500. The bottom flange portion 488 extends between the lower lateral flange portions 494 and 496. In contrast to the bottom flange portion 100 of the base portion 94, the bottom plane portion 488 does not extend continuously, it is interrupted by a cutout 502 which bites into the bottom flange portion 488 and extends substantially into the wedge-like portion 484.

Adjacent each juncture 498, 500, the base portion 482 has mounting pegs 504 formed on its front and rear faces (only the mounting pegs 504 on the front face of the base portion 482 are visible in FIG. 22B). The mounting pegs 504 are mateable with the small apertures 74 of an aperture grouping in the side plate 24 to attach the moveable angle box 480 to the side plate 24.

As best shown in FIG. 22A, the wedge-like structure 484 is defined by two, spaced apart, lateral triangular portions 506 and 508, a relatively short, upper wall 510 and a relatively long, lower wall 512. The lateral triangular portions 506 and 508 stand proud of the base portion 482. The lateral triangular portion 506 bounds and joins the upper wall 510 and the lower wall 512 on one side, while the lateral triangular portion 506 bounds and connects to the upper wall 510 and the lower wall 512 on the opposite side. The upper wall 510 extends forwardly of the base portion 482 at a slight decline angle as measured from a notional horizon. The lower wall 512 meets with the upper wall 510 where the latter terminates. The lower wall 512 extends downwardly from the upper wall 510 at a right angle to join the base portion 482.

Extending roughly three-quarters of the way up the lower wall 512, is the elongate cutout 502. It opens onto, and provides access to, the space defined by the wedge-like structure 484. The shape of the cutout 502 can be seen to be defined substantially by edge portions 514, 516 and 518. Straight edge portion 514 and 518 are generally parallel to each other and are joined to each other by the semi-circular edge portion 516. The width of the cutout 502 as measured between the edge portions 514 and 518 is larger than the diameter of the threaded portion of a carriage bolt 180 of the bolt assembly 68, but it is sized smaller than a flange nut 184 of the bolt assembly 68.

The angle box 480 is further provided with means for tying the angle box 480 to the side plate 24. In this embodiment such tying means are embodied in a tether or cable 520 that is attached at one end to the top flange portion 486 and anchored at the other end to the side plate 24. The tether 520 ensures that when the movable angle box 480 is not attached to the side plate 24 by way of its mounting pegs 504, it is nonetheless physically connected to the side plate 24 and will not be otherwise lost or misplaced.

FIGS. 22A and 22B show the movable angle box 480 in a bolt-securing position 522. In this position, the movable angle box 480 is mounted to the side plate 24 with the mounting pegs 504 of the movable angle box 480 mated with the apertures 74 formed in the side plate 24. The lower wall 512 of the wedge-shaped structure 484 is arranged such that it significantly occludes the aperture 72 formed in the side plate 24. As a result, the opening defined by the aperture 72 is severely constricted, and is now reduced to the size of the cutout 502. The cutout 502 is aligned with the aperture 74 along a line (similar to line T shown in FIG. 11) which represents the direction of the tensioning force applied by the side tensioning assembly employing the movable angle box 480.

Figure 23A:
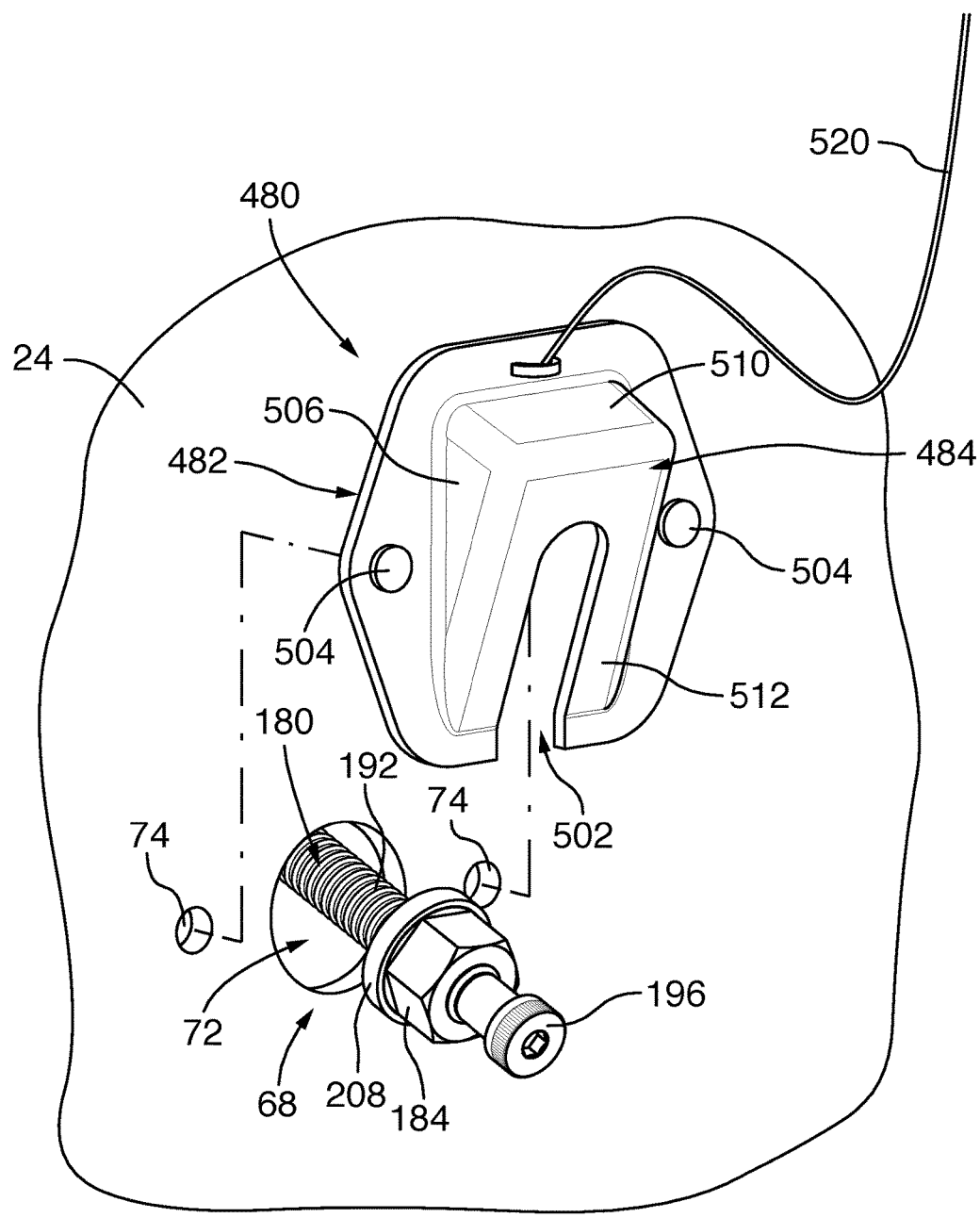
FIG. 23A is a perspective view of the angle box and side plate illustrated in FIG. 22A showing a bolt assembly inserted through an aperture defined in the side wall and the movable angle box exploded from the side plate and occupying a bolt-releasing position.

FIG. 23A shows the movable angle box 480 in a bolt-releasing position 524. In that position, the mounting pegs 504 are removed from the apertures 74 in the side plate 24. The movable angle box 480 is displaced from the aperture 74 in the side plate 24 such that it no longer occludes the aperture 74, leaving the opening defined by the aperture 74 fully exposed and unobstructed.

Figure 23B:
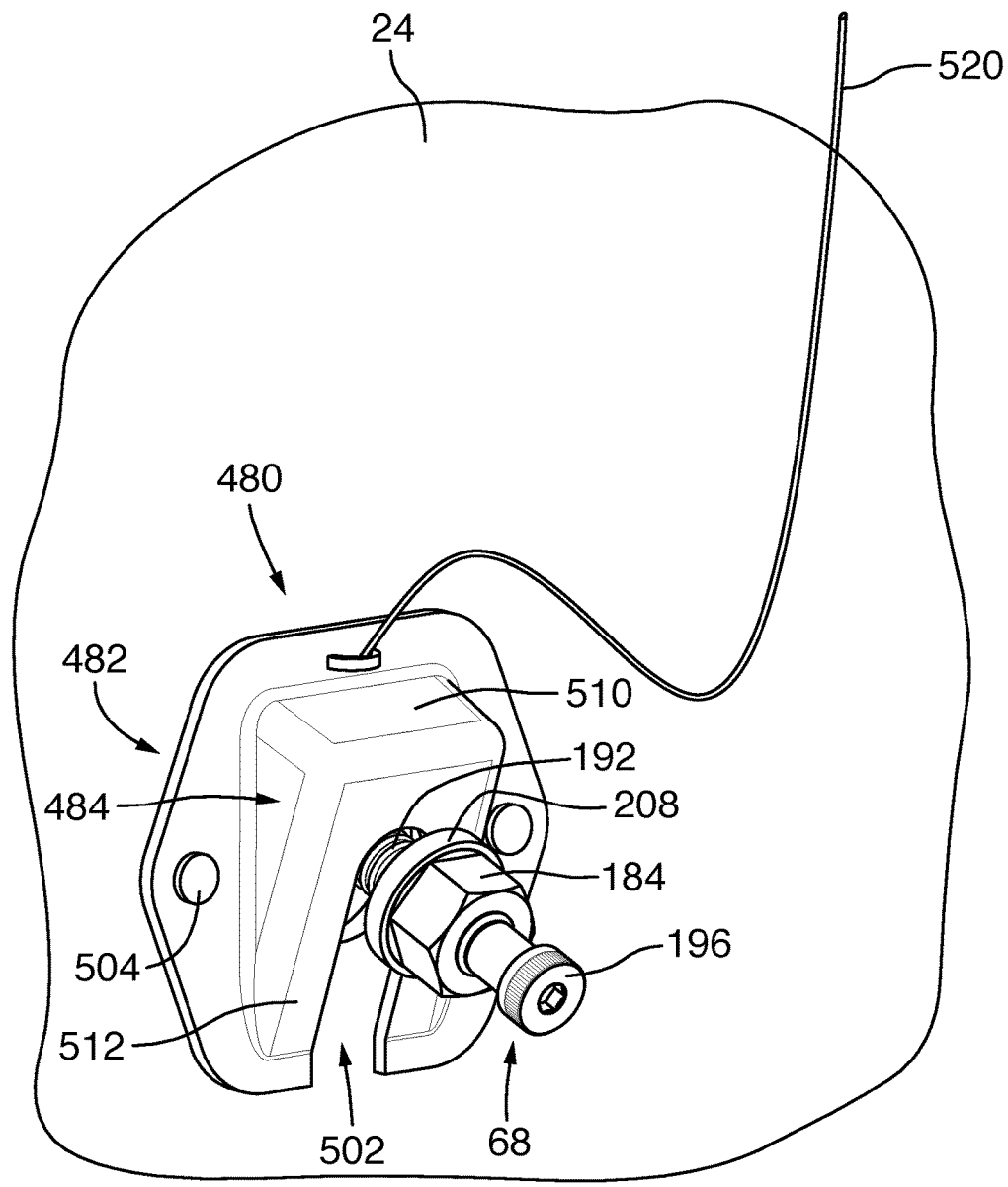
FIG. 23B is another perspective view of the angle box and side plate similar to that shown in FIG. 23A, except that the movable angle box is now shown occupying its bolt-securing position and receiving a bolt therethrough, the flange nut on the bolt being loosened so as to provide clearance between the flange nut and the movable angle box.
Figure 23C:
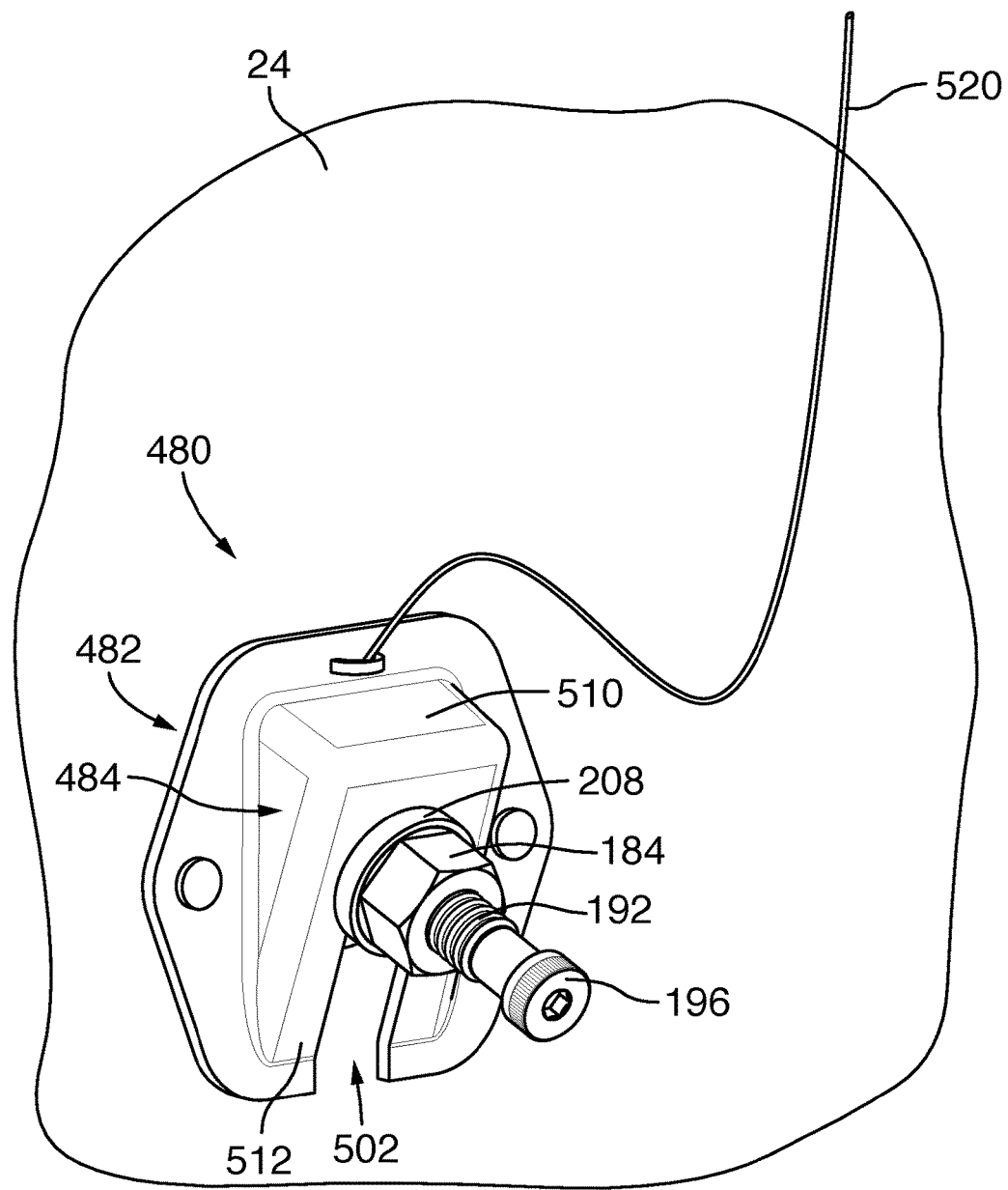
FIG. 23C is another perspective view of the angle box and side plate similar to that shown in FIG. 23A, except that the movable angle box is now shown occupying its bolt-securing position and receiving a bolt therethrough, the flange nut on the bolt being loosened so as to provide clearance between the flange nut and the movable angle box.

A description of an exemplary deployment of a tensioning assembly using a movable angle box 480 now follows with reference to FIGS. 23A, 23B and 23C. As a preliminary step, the movable angle box 480 is disengaged from the side plate 24 in that its mounting pegs 504 are removed from the apertures 74 in the side plate 24, and the movable plate is in a bolt-releasing position 524 so as to provide full access to the aperture 74 (see FIG. 23A). Also, the flange nut 184 of each of the bolt assemblies 80 is threaded towards the shoulder bolt 196.

The installation begins with positioning the tensioning rail 52 (not visible in FIGS. 23A, 23B and 23C) along with its associated bolt assembly. The bolt assembly 68 is disposed opposite the aperture 72 in the side plate 24 and the carriage bolt 180 is oriented downwardly. Thereafter, the bolt assembly 68 is inserted through the aperture 72 in the side plate 24 so as to significantly project therefrom. As shown in FIG. 23A, in this position, the portion of the shank portion 192 carrying the flange nut 184 and the shoulder bolt 196 protrudes well beyond the side wall 24, thereby providing sufficient clearance to allow the movable angle box 480 to be moved to its bolt-securing position 522 without interference from the flange nut 184.

It should be mentioned that as bolt assembly 68 is fitted through the aperture 72, the tensioning rail 52 is brought closer to the inner surface 58 of the side plate 24. The first lower bent portion 162 is received in the gap formed between the arms 46 and 48 of the tensioning hook 42.

Referring now to FIG. 23B, the movable angle box 480 is now moved from its bolt-releasing position 520 to its bolt-securing position 522. More specifically, the angle box 480 is moved towards the side plate 24 and positioned so that the cutout 502 is disposed above the carriage bolt 180 in alignment with it. Thereafter, the angle box is lowered so that the edges 514, 516 and 518 guide the movement of the angle box 480 relative to the carriage bolt 180, with the semi-circular edge 516 serving as a stop for the shank portion 192. The mounting pegs 504 are then aligned with the apertures 74 in the side plate 24 and urged to mate therewith.

Figure 11:
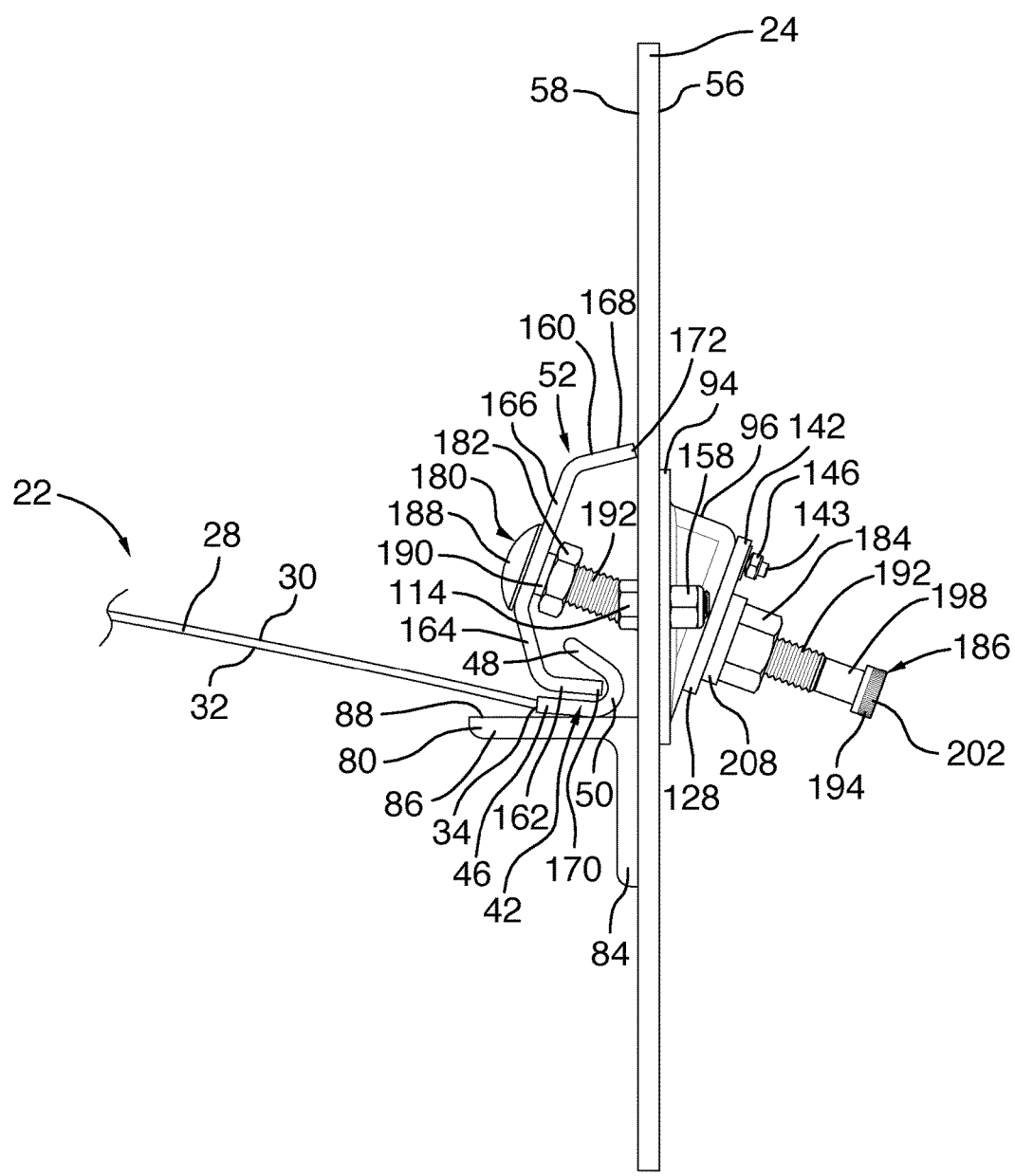
FIG. 11 is a magnified side elevation view of the encircled portion "11" indicated in FIG. 2, showing the first tensioning assembly tying the screen media to one of the side plates of the screening machine.
Figure 12:
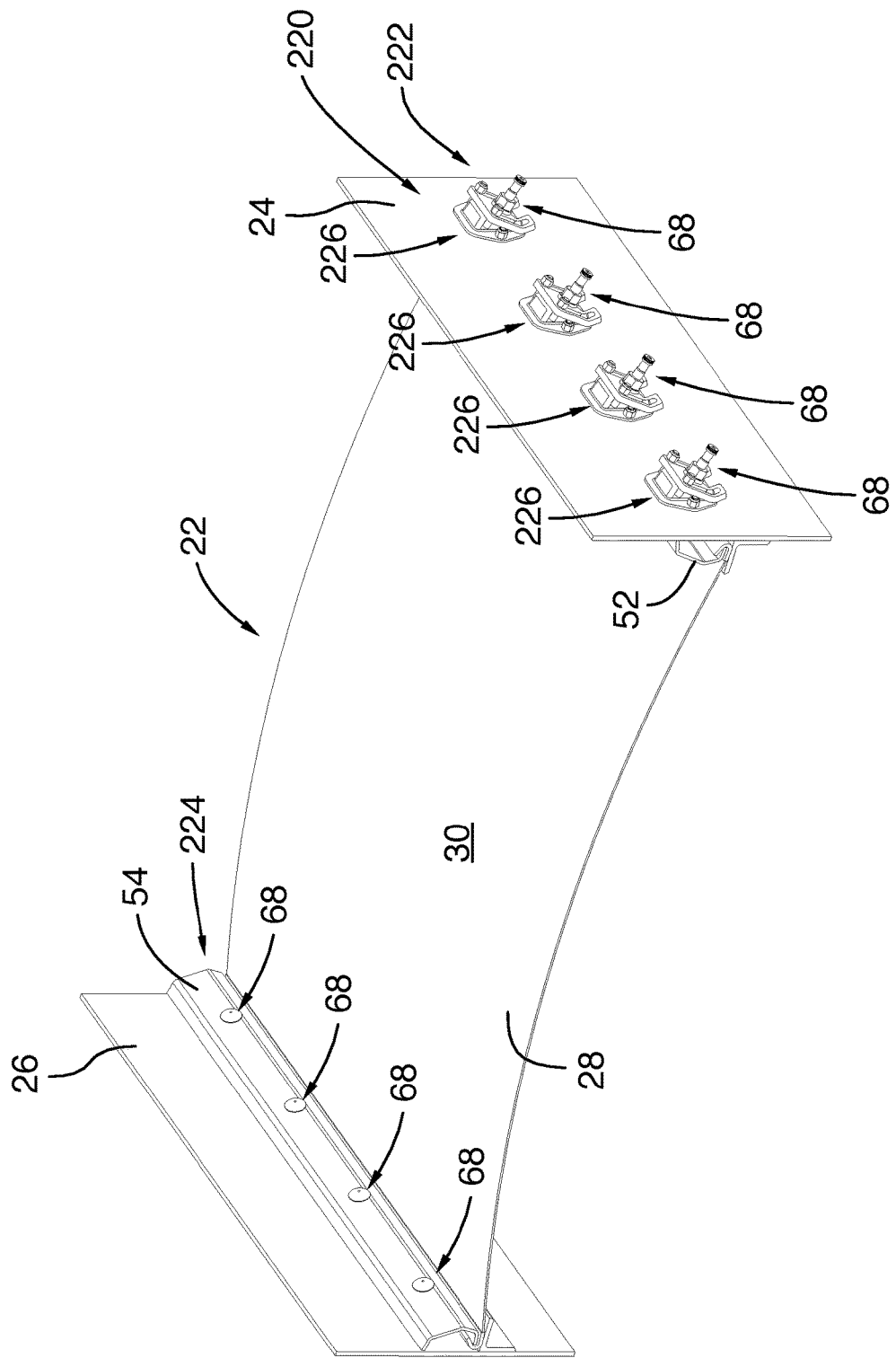
FIG. 12 is a top left perspective view showing a screen media panel being retained between a pair of opposed side plates of a vibrating-type screening machine by a tensioning system having a first and second tensioning assemblies, according to an alternative embodiment to that shown in FIG. 1.
Figure 13:
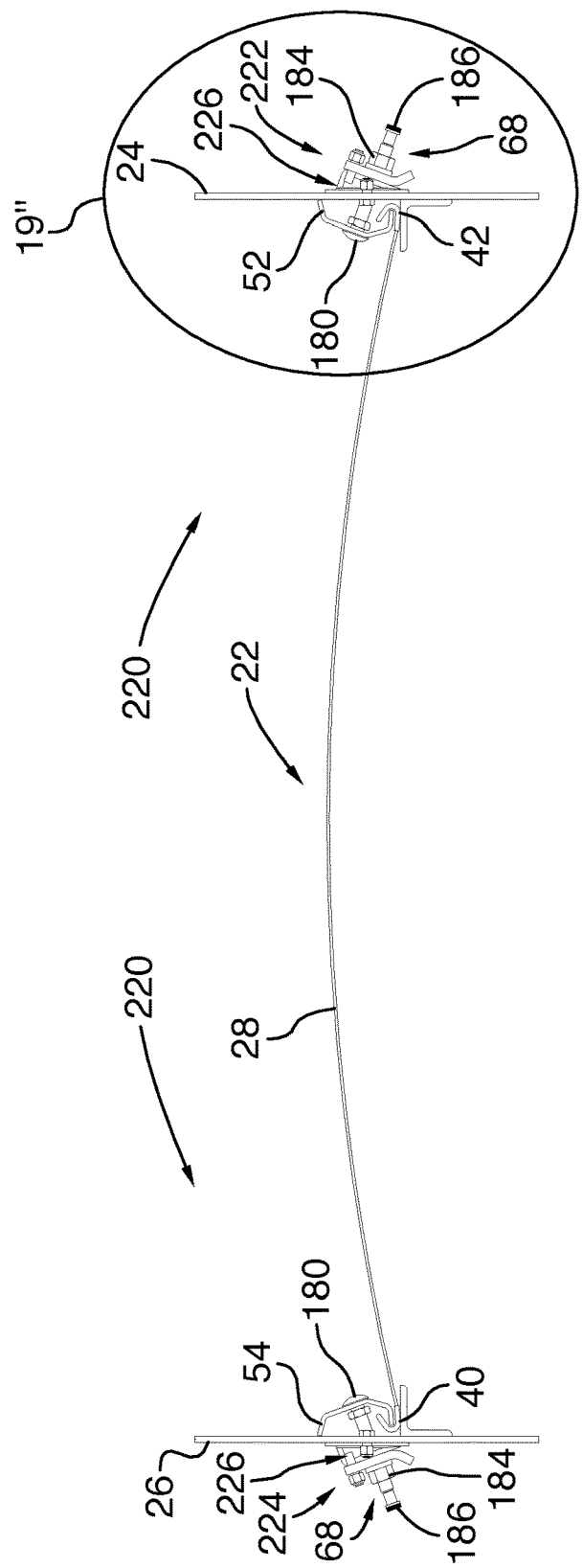
FIG. 13 is a side elevation view of the screen media, the side plates and the first and second tensioning assemblies shown in FIG. 12.
Figure 14:
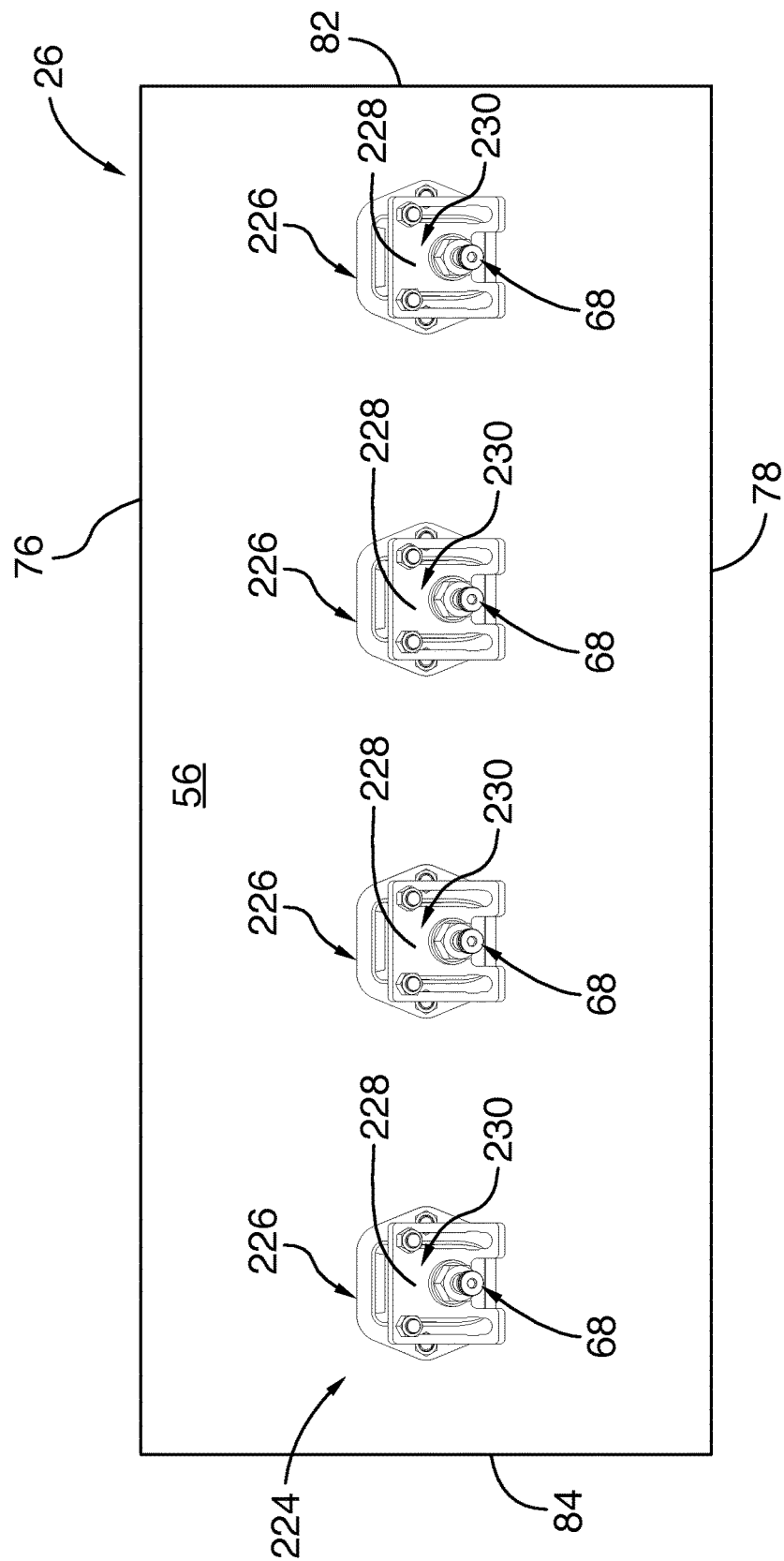
FIG. 14 is an end view of the screen media, the side plates and the second tensioning assembly in FIG. 12.

As a final step, the flange nut 184 in the bolt assembly 68 is threaded towards the movable angle box 480 so that the flange portion 208 of the flange nut 184 comes to bear against lower wall 512 of the angle box 480 (see FIG. 23C). The flange nut 184 is further tightened until sufficient tension in the carriage bolt 180 is created. As this occurs, the tensioning rail 52 forcefully engages the side plate 24 and the tensioning hook 42. The terminal end 172 of the fourth upper bent portion 168 abuts the inner surface 58 of the side plate 24 (similar to that which is shown in FIG. 11). Also, the terminal end 170 of the first lower bent portion 162 bears against the intermediate portion 50 pulling the tensioning hook 42 towards the side plate 24. The tension created by the tensioning assembly holds the screen media 22 tightly to the side plate 24 and on the deck frame (not shown).

Although the foregoing description and accompanying drawings relate to specific preferred embodiments of the present invention as presently contemplated by the inventor, it will be understood that various changes, modifications and adaptations, may be made without departing from the principles of the invention.

What is claimed is:

1. A side tensioning assembly for retaining screen media to a side plate in a vibrating-type screening machine, the side plate having an inner surface and an outer surface, the side tensioning assembly comprising:

a tensioning rail mountable to the inner surface of the side plate and connectable to a portion of the screen media;

at least one wedge-shaped structure mountable to the outer surface of the side plate; and at least one bolt assembly for fastening the tensioning rail to the side plate and to the at least one wedge-shaped structure; the at least one bolt assembly including a bolt connectable to the tensioning rail, the side plate and the at least one of wedge-shaped structure, a nut threadably engaged with the bolt for retaining the bolt to the at least one the wedge-shaped structure;

the at least one wedge-shaped structure including an aperture defined therein sized to allow the bolt assembly unobstructed passage therethrough, and a movable plate with a cutout formed therein; the cutout being sized larger than the bolt but smaller than the nut; the movable plate being movable between a bolt-securing position and a bolt-releasing position;

in the bolt-securing position, the movable plate partially occluding the aperture in the wedge-shaped structure with the cutout aligned with the aperture in the wedge-shaped structure such that when the bolt is tightly fastened to the wedge-shaped structure with the nut, the tensioning rail is drawn tightly against the inner surface of the side rail thereby applying a tensile force to the portion of the screen media;

in the bolt-releasing position, the movable plate being positioned so as to provide unobstructed access to the aperture in the wedge-shaped structure such that the bolt assembly can be detached from the wedge-shaped structure without requiring disassembly of the bolt assembly.

2. A side tensioning assembly for retaining screen media to a side plate in a vibrating-type screening machine, the side plate having at least one aperture, an inner surface and an outer surface, the side tensioning assembly comprising:

a tensioning rail mountable to the inner surface of the side plate and connectable to a portion of the screen media;

at least one bolt engaging structure mountable to the outer surface of the side plate; and at least one bolt assembly for fastening the tensioning rail to the side plate and to the at least one bolt engaging structure; the at least one bolt assembly including a bolt connectable to the tensioning rail, the side plate and the at least one bolt engaging structure, a nut threadably engaged with the bolt for retaining the bolt to the at least one bolt engaging structure;

the at least one bolt engaging structure including a cutout formed therein sized larger than the bolt but smaller than the nut; the at least one bolt engaging structure being movable between a bolt-securing position and a bolt-releasing position;

in the bolt-securing position, the bolt engaging structure occluding the at least one aperture in the side plate with the cutout aligned with the at least one aperture in the side plate such that when the bolt is tightly fastened to the bolt engaging structure with the nut, the tensioning rail is drawn tightly against the inner surface of the side rail thereby applying a tensile force to the portion of the screen media;

in the bolt-releasing position, the bolt engaging structure being positioned so as to provide unobstructed access to the cutout in the side plate such that the bolt assembly can be detached from the side plate without requiring disassembly of the bolt assembly.

3. The side tensioning assembly of claim 2 wherein the bolt engaging assembly includes at least one of a wedge-shaped structure and a movable plate.

4. The side tensioning assembly of claim 2 wherein the bolt engaging assembly includes both a wedge-shaped structure and a movable plate.

5. The side tensioning assembly of claim 2 wherein the cutout in the bolt engaging structure takes the form of a slot.

6. The side tensioning assembly of claim 5 wherein the slot is centrally located in the movable plate.

7. The side tensioning assembly of claim 2 wherein movement of the bolt engaging structure relative to the side plate is selected from the group consisting of: (a) translation; (b) rotation; and (c) a combination of sliding and rotation.

8. The side tensioning assembly of claim 2 wherein the bolt engaging structure is slidable relative to the side plate in a motion selected from the group consisting of: (a) side-to-side motion; (b) up and down motion and (c) motion along a diagonal direction.

9. The side tensioning assembly of claim 2 wherein the bolt engaging structure is hingedly connected relative to the side plate.

10. The side tensioning assembly of claim 2 wherein the bolt engaging structure is pivotally connected relative to the side plate.

11. The side tensioning assembly of claim 2 wherein the bolt engaging structure is tethered to the side plate.

12. A side tensioning system for retaining screen media between opposed first and second side plates in a vibrating-type screening machine, each side plate having at least one aperture, an inner surface and an outer surface, the side tensioning system comprising:

a first tensioning assembly operatively connectable to the first side plate; the first tensioning assembly including a first tensioning rail mountable to the inner surface of the first side plate and connectable to a first portion of the screen media, at least one bolt engaging structure mountable to the outer surface of the first side plate, and at least one bolt assembly for fastening the first tensioning rail to the first side plate and to the at least one bolt engaging structure of the first tensioning assembly; and a second tensioning assembly operatively connectable to the second side plate; the second tensioning assembly including a second tensioning rail mountable to the inner surface of the second side plate and connectable to a second portion of the screen media, at least one bolt engaging structure mountable to the outer surface of the second side plate, at least one bolt assembly for fastening the second tensioning rail to the second side plate and to the at least one bolt engaging structure of the second tensioning assembly; and each bolt assembly including a bolt connectable to one of the first and second tensioning rails, one of the first and second side plates and one of the bolt engaging structures, a nut threadably engaged with the bolt for retaining the bolt to one of the bolt engaging structures;

each bolt engaging structure including a cutout formed therein sized larger than the bolt but smaller than the nut; each bolt engaging structure plate being movable between a bolt-securing position and a bolt-releasing position;

in the bolt-securing position, the bolt engaging structure partially occluding the at least one aperture in the side plate with the cutout aligned with the at least one aperture in the side plate such that when one bolt of the bolt assembly is tightly fastened to the bolt engaging structure with one nut of the bolt assembly, one of the first and second tensioning rails is drawn tightly against the inner surface of one of the first and second side plates thereby applying a tensile force to one of the first and second portions of the screen media;

in the bolt-releasing position, the bolt engaging structure being positioned so as to provide unobstructed access to the at least one aperture in one of the first and second side plates such that the bolt assembly can be detached from one of the first and second side plates without requiring disassembly of the bolt assembly.

13. The side tensioning system of claim 12 wherein the at least one bolt engaging assembly includes at least one of a wedge-shaped structure and a movable plate.

14. The side tensioning system of claim 12 wherein the at least one bolt engaging assembly includes both a wedge-shaped structure and a movable plate.

15. A vibrating-type machine comprising:
a supporting structure for supporting screen media;
a pair of spaced apart first and second side plates attached to the supporting structure; each side plate having an at least one aperture, an inner surface and an outer surface,
a mechanism for imparting vibratory movement to the supporting structure;
screen media positionable between the first and second side plates;
a tensioning system for retaining screen media between the first and second side plates, the side tensioning system having:
a first tensioning assembly operatively connectable to the first side plate; the first tensioning assembly including a first tensioning rail mountable to the inner surface of the first side plate and connectable to a first portion of the screen media, at least one bolt engaging structure mountable to the outer surface of the first side plate, and at least one bolt assembly for fastening the first tensioning rail to the first side plate and to the at least one bolt engaging structure of the first tensioning assembly; and
a second tensioning assembly operatively connectable to the second side plate; the second tensioning assembly including a second tensioning rail mountable to the inner surface of the second side plate and connectable to a second portion of the screen media, at least one bolt engaging structure mountable to the outer surface of the second side plate, at least one bolt assembly for fastening the second tensioning rail to the second side plate and to the at least bolt engaging structure of the second tensioning assembly; and
each bolt assembly including a bolt connectable to one of the first and second tensioning rails, one of the first and second side plates and one of the bolt engaging structures, a nut threadably engaged with the bolt for retaining the bolt to one of the bolt engaging structures;
each bolt engaging structure including a cutout formed therein sized larger than the bolt but smaller than the nut; each bolt engaging structure being movable between a bolt-securing position and a bolt-releasing position;
in the bolt-securing position, the bolt engaging structure partially occluding the at least one aperture in one of the first and second side plates with the cutout aligned with the at least one aperture in one of the first and second side plates such that when one bolt of the bolt assembly is tightly fastened to the bolt engaging structure with one nut of the bolt assembly, one of the first and second tensioning rails is drawn tightly against the inner surface of one of the first and second side plates thereby applying a tensile force to one of the first or second portions of the screen media;
in the bolt-releasing position, the bolt engaging structure being positioned so as to provide unobstructed access to the at least one aperture in one of the first and second side plates such that the bolt assembly can be detached from the one of the first and second side plates without requiring disassembly of the bolt assembly.

16. A side tensioning system for attaching screen media onto at least one side plate in a vibrating-type screening machine, the at least one side plate having at least one aperture, an inner surface and an outer surface, the side tensioning system comprising:
a tensioning assembly operatively connectable to the at least one side plate;
the tensioning assembly including a tensioning rail mountable to the inner surface of the at least one side plate and connectable to a portion of the screen media, at least one bolt engaging structure mountable to the outer surface of the at least one side plate, and at least one bolt assembly for fastening the tensioning rail to the at least one side plate and to the at least one bolt engaging structure of the tensioning assembly;
the at least one bolt assembly including a bolt connectable to the tensioning rail, the at least one side plate and the at least one bolt engaging structure, a nut threadably engaged with the bolt for retaining the bolt to the at least one bolt engaging structure;
the at least one bolt engaging structure including a cutout formed therein sized larger than the bolt but smaller than the nut; the at least one bolt engaging structure being movable between a bolt-securing position and a bolt-releasing position;
in the bolt-securing position, the at least one bolt engaging structure partially occluding the at least one aperture in the at least one side plate with the cutout aligned with the at least one aperture in the at least one side plate such that when the bolt of the at least one bolt assembly is tightly fastened to the at least one bolt engaging structure with the nut of the at least one bolt assembly, the tensioning rail is drawn tightly against the inner surface of the at least one side plate thereby applying a tensile force to the portion of the screen media;
in the bolt-releasing position, the at least one bolt engaging structure being positioned so as to provide unobstructed access to the at least one aperture in the at least one side plate such that the at least one bolt assembly can be detached from the at least one side plate without requiring disassembly of the at least one bolt assembly.

17. The side tensioning system of claim 16 wherein the at least one bolt engaging assembly includes at least one of a wedge-shaped structure and a movable plate.

18. The side tensioning system of claim 16 wherein the at least one bolt engaging assembly includes both a wedge-shaped structure and a movable plate.

19. A vibrating-type machine comprising:
a supporting structure for supporting screen media;
at least one side plate attached to the supporting structure; the at least one side plate having an at least one aperture, an inner surface and an outer surface,
a mechanism for imparting vibratory movement to the supporting structure;
a tensioning system for attaching screen media to the at least one side plate, the side tensioning system having:
a tensioning assembly operatively connectable to the at least one side plate; the tensioning assembly including a tensioning rail mountable to the inner surface of the at least one side plate and connectable to a portion of the screen media, at least one bolt engaging structure mountable to the outer surface of the at least one side plate, and at least one bolt assembly for fastening the tensioning rail to the at least one side plate and to the at least one bolt engaging structure of the tensioning assembly; and
each bolt assembly including a bolt connectable to the tensioning rail, the at least one side plate and one of the bolt engaging structures, a nut threadably engaged with the bolt for retaining the bolt to one of the bolt engaging structures;

each bolt engaging structure including a cutout formed therein sized larger than the bolt but smaller than the nut; each bolt engaging structure being movable between a bolt-securing position and a bolt-releasing position;

in the bolt-securing position, the bolt engaging structure partially occluding the at least one aperture in the at least one side plate with the cutout aligned with the at least one aperture in the at least one side plate such that when one bolt of the bolt assembly is tightly fastened to the bolt engaging structure with one nut of the bolt assembly, the tensioning rail is drawn tightly against the inner surface of the at least one side plate thereby applying a tensile force to the portion of the screen media;

in the bolt-releasing position, the bolt engaging structure being positioned so as to provide unobstructed access to the at least one aperture in the at least one side plate such that the bolt assembly can be detached from the at least one side plate without requiring disassembly of the bolt assembly.

* * * * *